(12) United States Patent
Bandemer et al.

(10) Patent No.: US 12,248,802 B2
(45) Date of Patent: Mar. 11, 2025

(54) VIRTUAL DEVICE COLOCATION DETERMINATION USING DISTANCE MATRIX AGGREGATIONS

(71) Applicant: Clockwork Systems, Inc., Palo Alto, CA (US)

(72) Inventors: Bernd Bandemer, Sunnyvale, CA (US); Vinay Sriram, Palo Alto, CA (US); Balaji S. Prabhakar, Palo Alto, CA (US)

(73) Assignee: Clockwork Systems, Inc., Palo Alto, CA (US)

( * ) Notice: Subject to any disclaimer, the term of this patent is extended or adjusted under 35 U.S.C. 154(b) by 80 days.

(21) Appl. No.: 18/115,667

(22) Filed: Feb. 28, 2023

(65) Prior Publication Data

US 2023/0300056 A1 Sep. 21, 2023

Related U.S. Application Data

(60) Provisional application No. 63/320,161, filed on Mar. 15, 2022.

(51) Int. Cl.
| | |
|---|---|
| *G06F 9/455* | (2018.01) |
| *G06F 9/50* | (2006.01) |
| *H04L 41/0893* | (2022.01) |
| *H04L 43/045* | (2022.01) |
| *H04L 43/50* | (2022.01) |

(52) U.S. Cl.
CPC ........ *G06F 9/45558* (2013.01); *G06F 9/5077* (2013.01); *H04L 41/0893* (2013.01); *H04L 43/045* (2013.01); *H04L 43/50* (2013.01); *G06F 2009/45583* (2013.01)

(58) Field of Classification Search
CPC ...... G06F 18/22; G06F 18/2148; G06F 18/23; G06T 15/005; G06N 3/0895; G06N 3/088; G06V 20/54
See application file for complete search history.

(56) References Cited

U.S. PATENT DOCUMENTS

| | | | | |
|---|---|---|---|---|
| 10,042,659 | B1 * | 8/2018 | Gupta | G06F 1/32 |
| 10,623,173 | B1 * | 4/2020 | Geng | H04L 7/033 |
| 10,938,585 | B2 * | 3/2021 | Jose | G01S 13/825 |
| 2003/0142811 | A1 * | 7/2003 | Teixeira | H04M 3/42136 |
| | | | | 379/327 |
| 2009/0327342 | A1 * | 12/2009 | Xiao | G06F 16/29 |
| 2013/0185433 | A1 * | 7/2013 | Zhu | H04L 43/0876 |
| | | | | 709/226 |

(Continued)

OTHER PUBLICATIONS

PCT International Search Report and Written Opinion, PCT Application No. PCT/US2023/14171, May 23, 2023, 11 pages.

*Primary Examiner* — Mahran Y Abu Roumi
(74) *Attorney, Agent, or Firm* — Fenwick & West LLP

(57) ABSTRACT

A device determines whether virtual resources are co-located on a physical resource. The device computes a plurality of distance matrices, each distance matrix of the plurality of distance matrices computed using a different raw input signal. The device combines the plurality of distance matrices into a combined distance matrix. The device determines, using the combined distance matrix, subsets of the virtual resources that are using shared physical hardware. The device outputs indicia of the subsets.

18 Claims, 17 Drawing Sheets

(56) References Cited

U.S. PATENT DOCUMENTS

| | | | |
|---|---|---|---|
| 2013/0238780 A1* | 9/2013 | Devarakonda | G06F 9/5072 |
| | | | 718/1 |
| 2015/0317390 A1* | 11/2015 | Mills | G06F 16/35 |
| | | | 707/777 |
| 2016/0209505 A1* | 7/2016 | Kluge | H04W 56/0065 |
| 2016/0232036 A1* | 8/2016 | Zhu | H04L 47/762 |
| 2020/0187246 A1* | 6/2020 | Amuru | H04W 48/12 |
| 2021/0377107 A1* | 12/2021 | Reed | H04L 41/0897 |
| 2022/0095262 A1* | 3/2022 | Kazaz | G01S 13/84 |
| 2022/0318041 A1* | 10/2022 | Perneti | G06F 9/45558 |
| 2022/0391639 A1* | 12/2022 | Gurumurthy | G06F 18/23 |

* cited by examiner

400

| 410 Probe ID | 420 Transmitting Node | 430 Receiving Node | 440 Transmit Time | 450 Receive Time |
|---|---|---|---|---|
| 1 | A | B | T1 | T1 + TT |
| 2 | A | B | T1 + δ | T1 + δ + TT + D |
| 3 | A | B | T2 | T2 + TT + D |
| 4 | A | B | T2 + δ | T2 + δ + TT |
| 5 | A | B | T3 | T3 + TT |
| 6 | A | B | T3 + δ | T3 + δ + TT |

Rows 1–2: Reject
Rows 3–4: Reject
Rows 5–6: Coded Probe

δ = transmission time spacing
TT = transit time for one probe
D = Delay

FIG. 4

VIRTUAL DEVICE COLOCATION DETERMINATION USING DISTANCE MATRIX AGGREGATIONS

CROSS REFERENCE TO RELATED APPLICATIONS

This application claims the benefit of U.S. Provisional Application No. 63/320,161, filed Mar. 15, 2022, which is incorporated by reference in its entirety.

TECHNICAL FIELD

This application relates generally to network transmissions, and more specifically relates to determining whether sources of network transmissions are co-located.

BACKGROUND

When cloud customers subscribe to cloud providers for virtual resources (e.g., virtual machines), those customers are not provided information as to where the physical resources physically placed, and instead are simply given soft promises like a guaranteed CPU power or bandwidth, without knowledge of resource placement. This is because cloud provider offerings are opaque and use proprietary algorithms to allocate resources according to their own optimizations. In some cases, live resources like VMs (Virtual Machines) might get migrated as they are running. Accordingly, limitations in determining resource location result in suboptimal application performance.

SUMMARY

In many cases, applications may benefit from co-location of virtual resources on a same physical hardware, and in many other cases, applications may benefit from virtual resources being distributed across physical hardware. Trade-offs for co-location as opposed to being placed on different physical hosts are consequential in application usage and experience. As an example, an application may have a higher outbound and inbound network capacity where virtual resources are not co-located on a same server, as those virtual resources are not sharing a same NIC and therefore are not competing for shared portions of the capacity of the NIC. On the other hand, virtual resources that are co-located may have a lower-latency connection, as they may avoid some or all need to communicate over a data network, and may communicate directly over a local data bus.

Systems and methods are disclosed herein for determining whether resources are co-located, which thereby enables optimal resource usage given a schema of an application. In an embodiment, a device determines whether virtual resources are co-located on a physical resource. The determination is performed by aggregating a plurality of timestamps into a data structure, each timestamp of the plurality of timestamps corresponding to one of a sent time or a receive time of a network packet exchanged between two of the virtual resources, the data structure representing one or more raw signals of distance between sets of the virtual resources that exchanged network packets, the virtual resources synchronized to a common reference clock. The device determines, using the data structure, subsets of sets of virtual resources that are using shared physical hardware. The device outputs indicia of the subsets.

In an embodiment, a device determines whether virtual resources are co-located on a physical resource. The device computes a plurality of distance matrices, each distance matrix of the plurality of distance matrices computed using a different raw input signal. The device combines the plurality of distance matrices into a combined distance matrix. The device determines, using the combined distance matrix, subsets of the virtual resources that are using shared physical hardware. The device outputs indicia of the subsets.

BRIEF DESCRIPTION OF THE DRAWINGS

FIG. 4 is a data structure diagram that illustrates probe records, and manners of identifying coded probes from the probe records, according to an embodiment of the disclosure.

DETAILED DESCRIPTION OF THE PREFERRED EMBODIMENTS

Figure 1:
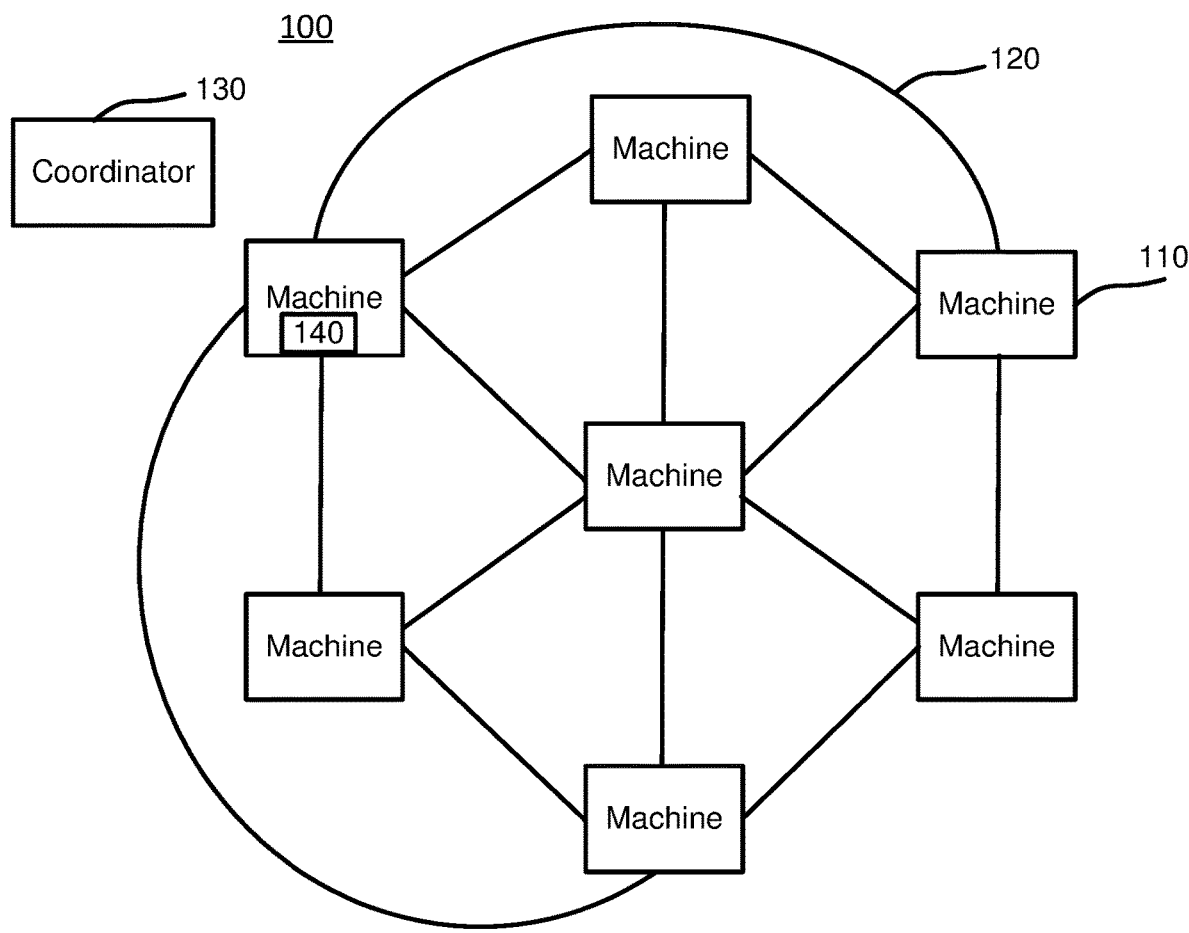
FIG. 1 is a graph of a network including a coordinator for executing an embodiment of the disclosure.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

In order to ensure clocks are synchronized to a high degree of accuracy, at least two parameters are controlled on a continuous (e.g., periodic, but ongoing) basis. First, offset, which describes a difference by which two clocks differ in their estimation of time, is determined and adjusted for. For example, if clock A estimates that it is currently 4:05 pm, and clock B estimates that it is currently 4:15 pm, then an offset of 10 minutes exists between clock A and clock B. Second, frequency drift (also referred to as "drift"), which describes a difference in the frequency of two clocks, is determined and adjusted for. For example, inexpensive clocks have quartz components and quartz is sensitive to temperature and vibration. As temperature changes, or vibration occurs, the frequency of a clock using quartz will change over time, and this change is tracked as described herein.

The systems and methods disclosed herein may be used to improve accuracy of clock synchronization to a degree of nanoseconds due to finetuned systems and processes for estimating offset and drift of any given clock. Further, clocks are guaranteed to not deviate from a time indicated by a reference clock beyond an upper and lower bound, the upper and lower bound being within twenty-five standard deviations of synchronization error, which is on the order of one microsecond. Offset and drift estimations contain noise, which is introduced based on, e.g., queuing delays of packets used to estimate offset and drift, as well as the effect of network operation (e.g., latency introduced during transmission). The finetuned systems and processes of estimating offset and drift as described herein are resistant to noise from offset and drift estimates (e.g., using advanced filtering techniques), and thus enable highly precise clock synchronization. These systems and methods achieve such accuracy even when the response of each clock to control input may be different (e.g., responses differ between different clocks), unknown (e.g., a clock's response is not known a priori), and time-varying (e.g., a clock's response changes over time). This allows these systems and methods to be applied to commodity, off-the-shelf, and inexpensive clocks. Further, these systems and methods can be implemented without a requirement for implementing any extra hardware.

FIG. 1 is a graph of a network including a coordinator for executing an embodiment of the disclosure. Network 100 includes machines 110, which are the nodes of the graph. The term "machine" refers to any device that maintains a clock or produces timestamps, such as a physical or virtual machine, a server, a server blade, a virtual machine, and the like. Each of machines 110 includes a local clock (e.g., as implemented in a computer processing unit (CPU) of a machine, or as implemented in a device that is operably coupled to a machine, such as a network interface card (NIC) of a machine). As depicted, network 100 is a mesh network, where each machine 110 is linked to each other machine 110 by way of one or more links (some links omitted for clarity). However, network 100 may be any other type of network. For example, network 100 may be a network where machines are serially connected on a wire, or may be in any other configuration. The network may be a large network spanning multiple physical regions (e.g., New York to San Francisco), or a small network, such as a network within a single server blade. In an embodiment, network 100 may be a network of clocks on one or more printed circuit boards.

The communication links between any pair of machines are represented as an edge 120 between the nodes in the graph. Each edge 120 typically represents multiple paths between any two machines 110. For example, the network 110 may include many additional nodes other than the machines 110 that are shown, so that there may be multiple different paths through different nodes between any pair of machines 100.

Network 100 additionally includes coordinator 130 and reference clock 140. In this example, coordinator 130 commands machines 110 to obtain network observations by probing other machines 110, as will be described in greater detail below with respect to FIG. 3. Coordinator 130 may store, or cause to be stored, records of those network observations, as will be described in greater detail below with respect to FIG. 4. Coordinator 130 may additionally transmit control signals to machines 110. The term control signal, as used herein, may refer to a signal indicating that the frequency of a local clock of a machine is to be adjusted by a specified amount (thus correcting a drift of the local clock), and may also refer to a signal indicating that a time indicated by a local clock a machine is to be adjusted by a specified amount (thus correcting an offset of the local clock).

In an embodiment, coordinator 130 stores, either within a machine housing coordinator 130 or within one or more machines of network 100, a graph that maps the topology of network 100. The graph may include a data structure that maps connections between machines of network 100. For example, the graph may map both direct connections between machines (e.g., machines that are next hops from one another, either physically or logically), as well as indirect connections between machines (e.g., each multi-hop path that can be taken for a communication, such as a probe, to traverse from one machine to another). The graph may additionally include network observations corresponding to each edge in the graph (e.g., indicating probe transit times for probes that crossed the edge, and/or additional information, such as information depicted in FIG. 4).

One of the machines contains a reference clock 140. Reference clock 140 is a clock to which the clocks within the machines of network 100 are to be synchronized. In an embodiment, reference clock 140 is a highly calibrated clock that is not subject to drift, which is contained in a machine 110 that is different than the other machines to be synchronized. In another embodiment, reference clock 140 may be an off-the-shelf local clock already existing in a machine 110 that will act as a master reference for the other machines 110, irrespective of whether reference clock 140 is a highly tuned clock that is accurate to "absolute time" as may be determined by an atomic clock or some other highly precise source clock. In such scenarios, coordinator 130 may select which machine 110 will act as the master reference arbitrarily, or may assign the reference machine based on input from an administrator. The reference clock may be a time source, such as a global positioning system (GPS) clock, a precision time protocol (PTP) Grandmaster clock, an atomic clock, or the like, in embodiments where the reference clock 140 is accurate to "absolute time." As will be described in greater detail with respect to FIGS. 6-8, coordinator 130 may use reference clock 140 when calibrating a control signal. By signaling corrections to frequency and/or offset based on reference clock 140, coordinator 130 achieves high-precision synchronization of the local clocks of machines 110 to the reference clock 140.

While only one reference clock 140 is depicted in FIG. 1, in an embodiment, multiple reference clocks 140 may be present. For example, additional reference clocks may be used for redundancy in case of failures of the reference clocks or the machines housing them. As another example, machines 110 may be divided into multiple groups (e.g., based on settings applied by an administrator of network 100). For example, network 100 may be configured to divide machines 110 into groups that each have a predefined number, or percentage, of machines 100, which may improve performance or implementation. Within each group, one machine may be nominated to be a reference, and the clock of that machine will thus be used as the reference clock for the remaining machines. Further, the groups may nominate one group as a reference group, thus leading to the reference group's reference clock acting as a reference for all groups. The reference clock and group may be nominated automatically consistent with clock nomination described herein, or may be input by a network administrator. As an example, where a network includes five thousand machines, and an administrator programs the network to divide the machines into groups that each hold one hundred machines (e.g., based on specifying one hundred machines, or by specifying a percentage), there will be fifty groups of machines, each including one hundred machines. One of the one hundred machines will be a reference machine, and the other ninety-nine of the one hundred machines will be sync to the reference machine's clock. Moreover, of the fifty groups, one will be a reference group, and the other fourty-nine groups will sync to the reference group.

Coordinator 130 may be implemented in a stand-alone server, may be implemented within one or more of machines 110, or may have its functionality distributed across two or more machines 130 and/or a standalone server. Coordinator 130 may be accessible by way of a link 120 in network 100, or by way of a link to a machine or server housing coordinator 130 outside of network 100. Reference clock 140 may be implemented within coordinator 130, or may be implemented as a separate entity into any of machines 110, a standalone server within network 100, or a server or machine outside of network 100.

Figure 2:
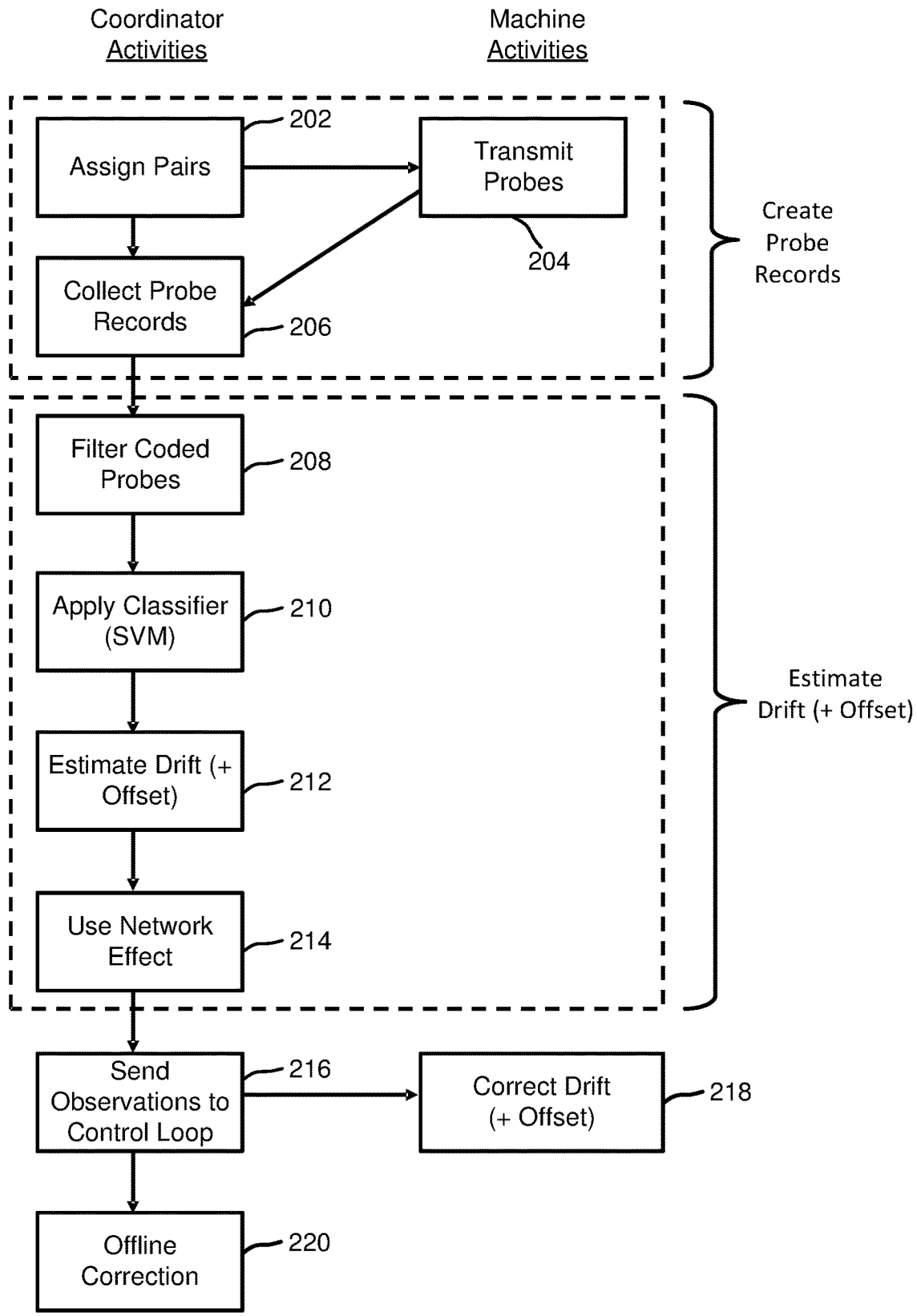
FIG. 2 is a data flow diagram for correcting clock frequency and/or offset, according to an embodiment of the disclosure.

FIG. 2 is a data flow diagram for correcting clock frequency and/or offset, according to an embodiment of the disclosure. The left column of FIG. 2 describes activities of a coordinator (e.g., coordinator 130) in achieving highly precise clock synchronization by correcting clock frequency (i.e., drift) and/or offset; the right column describes activities of machines (e.g., machines 110). FIG. 2 can be thought of as including three phases—a first phase where network observations are made by having machines probe other machines of a network (e.g., network 100), a second phase where the network observations are used to estimate offset and drift of the machines, and a third phase where frequency and/or offset is compensated/corrected in order to achieve highly precise clock synchronization between the machines.

As part of the first phase, data flow 200 begins with a coordinator (e.g., coordinator 130) assigning 202 machine pairs. The term pair, as used herein, refers to machines that send probes to one another for the purpose of collecting network observations. As used herein, the term network observations may refer to observable qualities of a network (e.g., effect of network operation, as defined below; queuing delays; observable drift; offset; etc.). The term probes, as used herein, refers to an electronic communication transmitted from one machine to another machine, where the electronic communication is timestamped at its time of transmission from a sending machine, and at its time of receipt at a receiving machine. The timestamps may be applied by any component of the machines that are configured to apply timestamps, such as respective CPUs of the sending and receiving machines and/or respective NICs that are a part of, or that are operably coupled to, the sending and receiving machines. As will be described in further detail with respect to FIG. 3, a single machine typically is paired with multiple other machines. When assigning machine pairs, the coordinator may assign a machine to pair with a number of machines, the number being less than all machines in the network. In an embodiment, the number and pairings of machines may be predefined or may dynamically change based on network conditions (e.g. congestion, latency, etc.). The machines may be selected at random, or through a deterministic algorithm.

Figure 3:
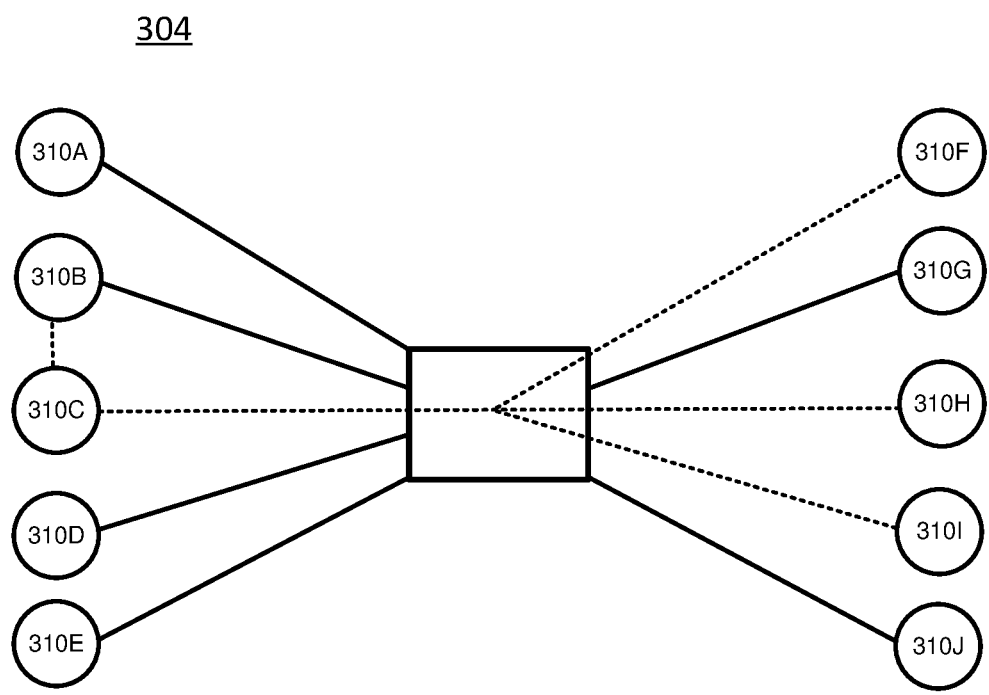
FIG. 3 is a block diagram of a system that illustrates probe transmission, according to an embodiment of the disclosure.

Data flow 200 progresses by coordinator 130 instructing the paired machines to transmit 204 probes to one another, which will also be described in further detail with respect to FIG. 3. The network observations collected from the probe transmissions are collected 206 into probe records. The term probe record, as used herein, may refer to a data structure including network observations obtained from the probe transmissions, such as the identity of a transmitting machine and a receiving machine, a transmit timestamp, a receive timestamp, etc. The transit time for a probe may be determined based on the transmit timestamp and the receive timestamp. Probe records are described in further detail below with respect to FIG. 4. While the embodiment described here and depicted in FIG. 3 indicates that the coordinator collects the probe records, in an embodiment, some or all of the machines may each collect probe records pertaining to probes transmitted to or from them, and may themselves perform processing on the probe records.

After the probe records are collected, the coordinator (e.g., coordinator 130) enters the second phase of using the collected probe records to estimate offset and/or drift for the machines (e.g., machines 110). In this example, to achieve accurate estimations, the coordinator first filters 208 the probe records to identify coded probes. The term coded probes, as used herein, refers to probes that correspond to probe records that are not affected by noise, such as delay caused from queuing the probes. One manner in which the coordinator identifies coded probes is described in further detail with respect to FIG. 4. The subset of probe records that correspond to coded probes may be referred to as coded probe records. In an embodiment where probe records are collected at a given machine, that given machine may perform the filtering 208 of the probe records collected by that given machine.

Data flow 200 continues by applying 210 a classifier to the coded probe records. The classifier may be a machine learning model trained through supervised learning. An example classifier is a support vector machine ("SVM"). The coordinator may input upper and lower bound points derived from coded probe data (i.e., samples of transit time) from two paired machines over a time period. The output of the classifier is a linear fit to the transit time data with a slope and intercept. Data flow 200 then continues with the coordinator estimating 212 the drift between pairs of machines. In an embodiment, the coordinator estimates drift to be equivalent to, or a function of, the slope of the linear fit (i.e., estimate of rate of change of transit time). The coordinator may also estimate offset using the intercept of the linear fit. Determining/estimating offset may be performed in a similar manner to doing so for drift wherever disclosed. In an embodiment where probe records are collected at a given machine, that given machine may perform the applying 210 of the classifier to the probe records collected by that given machine, and the estimating 212 of the drift between the pairs of machines.

The drift estimate may not be completely accurate because, while the coded probes did not suffer from queuing delay, the coded probes may have suffered from the effect of network operation. The effect of network operation, as used herein, may refer to noise caused by components of a network. For example, a link or gateway between two paired machines may introduce latency or jitter that affects the drift estimation. In an embodiment, the coordinator uses 214 the network effect based on frequency drift estimations across three or more machines. Further details for using 214 the network effect will be described with respect to FIG. 5 below.

The coordinator sends 216 observations to a control loop of a local clock of a machine, e.g., by applying a filter to the estimated drift that is based on the effect of the network operation, or by feeding the estimated drift and the effect of the network operation to a machine learning model, the output of which is the absolute drift. Here, "absolute" drift or offset are relative to the reference clock. Further details about the control loop and how the coordinator estimates the absolute drift are described in further detail below with respect to FIGS. 6-8. After estimating the absolute drift, the coordinator may determine whether to correct 218 the clock frequency in real-time or near real-time. Absolute offsets may also be corrected 218, or the coordinator may perform 220 an offline correction. How to determine whether to correct in real-time, or offline, is described further below with reference to FIGS. 6-7.

In addition to correcting clock frequency and/or offset, process 200 recurs periodically for each machine pair to ensure that any new offset and drift that has occurred after correcting clock frequency and/or offset is continuously corrected. For example, process 200 may occur periodically (e.g., every two seconds) to ensure synchronization across the network (e.g., network 100) is maintained.

FIG. 3 is a block diagram of a system that illustrates probe transmission, according to an embodiment of the disclosure. System 304 depicts a network (e.g., network 100) with machines 310. Machines 310 have the same functionality described with respect to machines 110 of FIG. 1. System 304 depicts the transmitting 204 of probes between paired machines described with respect to FIG. 2. The number of machines that are paired to a given machine may be a number that is fixed by an administrator. In an embodiment, coordinator 130 may dynamically adjust the number of machines that are paired to each given machine for probing based on network conditions. For example, if network connectivity is above a threshold quality (e.g., based on a low amount of latency), coordinator 130 may reduce a number of machines that are paired for probing proportionally to the quality of network connectivity. On the other hand, as network connectivity quality deteriorates, coordinator 130 may increase the number of machines that are paired for probing to each given machine. The number of machines that are paired may also vary based on network size.

When selecting which machines should be paired to a given machine, coordinator 130 may randomly determine each machine to which the given machine should be paired. In an embodiment, coordinator 130 non-randomly determines pairings based on ease of computation, accuracy (e.g., clock synchronization accuracy as dictated by the network graph), and load balancing across each machine 110. Coordinator 130 may judiciously determine pairings based on design choice, with an administrator selecting pairings, or selecting parameters that cause certain pairings to be selected. Further, coordinator 130 may instruct a larger number of pairings to occur for machines that have a high level of diversity, relative to a number of pairings for machines that have a low level of diversity. As used herein, the term "diversity" may refer to a large number of paths from which a probe may cross within network 100 to reach a machine from another machine; the higher the number of paths, the higher the diversity.

While FIG. 3 does not depict a number of probes that pass between each pair of machines, it is noted that probes may occur at a particular frequency or period of time, which may vary based on one or more parameters. For example, coordinator 130 may command a machine that has a high diversity to transmit a large number of probes to one or more paired machines, each down a different path, as compared to a machine that has a low diversity, which may transmit a lower number of probes. Coordinator 130 thus may command machines to transmit machines to paired machines at a frequency that varies proportionate to diversity.

As depicted, the coordinator (e.g., coordinator 130) determines 202 that machine 310C of machines 310 is paired with machine 310B, machine 310F, machine 310H, and machine 310I, as shown by the dashed lines. Thus, machine 310C transmits 204 probes to machines 310B, 310F, 310H, and 310I, and receives probes from those same machines. The term "exchange" is used herein to describe scenarios where paired machines transmit and receive probes from one another. As used herein, the term exchange does not imply a timing aspect, such as a requirement that machines are transmitted simultaneously or responsive to one another.

In an embodiment, network 100 may be a trustless system, such as a system facilitating a blockchain network. In such an embodiment, some of machines 110 may misbehave and misrepresent data used to determine offset and/or drift. In such a scenario, in addition to the probes discussed above and with respect to FIG. 4, coordinator 130 may instruct machines 110 to probe, at low frequency (e.g., once per every ten, or one hundred, or one thousand probes sent in normal course), a larger number of machines (e.g., one-third of the machines of network 100). Coordinator 130 may determine therefrom whether the data obtained from the larger number of machines is consistent with the smaller number of machines that are probed in normal course (e.g., within a threshold tolerance amount of drift and/or offset), and may alert an administrator or take corrective action if inconsistent probe data is detected.

FIG. 4 is a data structure diagram that illustrates probe records, and manners of identifying coded probes from the probe records, according to an embodiment of the disclosure. Data structure 400 includes exemplary probe records for a plurality of probes. While data structure 400 is depicted to include probe records for a single transmitting machine "A" (which is, e.g., a machine 110 of network 100) and a single receiving machine "B," any number of transmitting or receiving machines may have probe records stored within data structure 400. Column 410 includes identifiers for probes, each identifier 1 through 6 corresponding to a probe record for a probe. Column 420 indicates which machine transmitted a probe indicated by a given probe record. Column 420, as depicted, indicates that a transmitting machine labeled "A" transmitted each probe; however, this is merely exemplary and various transmitting machines may be identified in column 420.

Column 430 indicates which machine received a probe indicated by a given probe record. Column 430, as depicted, indicates that a receiving machine labeled "B" received each probe; however, this is merely exemplary and various receiving machines may be identified in column 430. Column 440 indicates a transmit time of a probe. The transmit time is a time that is timestamped either by the transmitting machine itself (e.g., a CPU of transmitting machine "A" of network 100), or by an interface or device operably coupled to the transmitting machine (e.g., a NIC of transmitting machine "A" of network 100). Similarly, column 450 indicates a receive time of a probe, which is a timestamp by the receiving machine or, e.g., a NIC of the receiving machine. In an embodiment, a machine having a single CPU may have a plurality of NICs. In such an embodiment, coordinator 130 may cause the multiple NICs of a machine (e.g., the receiving machine) to sync to a clock of the CPU of the machine (e.g., by having the CPU synchronize its time to the time of the NIC, using the NIC as a reference machine as described herein), and then have the other NICs synchronize to the CPU, thus causing the multiple NICs of the machine to be synchronized.

The coordinator may command machines to transmit probes with a specified or predetermined time interval between probes. As used herein, the term "transmission time spacing" (δ) refers to the specified interval or predetermined time interval between the transmission times of two probes. The interval may be a constant value or may be dynamically selected by the coordinator based on network conditions (e.g., if the network is congested, a longer transmission time spacing may be selected). As can be seen in FIG. 4, probe 1 is sent at time T1, which may be an arbitrary time or a time specified by the coordinator. Probe 2 is sent at time T1+δ, as the coordinator has instructed transmitting machine A to transmit a probe to receiving machine B at one or more time intervals. Further probes may be commanded by the coordinator to be transmitted from transmitting machine A to receiving machine B from the reference point of time T1; however, for ease of illustration, only two are shown in FIG. 4. Similarly, probes 3 and 4 are sent at times T2 and T2+δ, respectively, and probes 5 and 6 are sent at times T3 and T3+δ, respectively.

Probe IDs 1 and 2, 3 and 4, and 5 and 6 are paired to illustrate how the coordinator determines whether a pair of probes are coded probes. Coded probes are probes that are transmitted with a specific spacing of δ, or within a threshold distance from δ. That is, the probes are coded based on the space between each probe. Delay in timestamping probes may be caused by queues at a transmitting machine 420 and/or at a receiving machine 430 or through intermediate nodes. Coded probes are thus pairs of probes that are consecutively transmitted by a same transmitting machine 420, and received by a same receiving machine 430, with receive times that differ by δ, or within a threshold margin of δ (to accommodate minimal differences in delay between the two probes). That is, the transit times of two coded probes is approximately the same. While pairs are primarily used to describe coded probes, this is merely exemplary; coded probes may be triplets, quadruplets, etc., of probes with a spacing of δ.

Probes 1 and 2 show a scenario where two probes do not form coded probes because probe 1 has a transit time of TT, but probe 2 has a transit time of TT+D (D representing a delay), where D is greater than a threshold margin. That is, probe 2 has a transit time that is D longer than probe 2. Probes 3 and 4 show a scenario where two probes do not form coded probes because probe 3 has a transit time that is D longer than probe 4. Probes 5 and 6, however, are coded probes because they have the same transit times (to within an acceptable threshold).

In an embodiment, data structure 400 is stored in memory directly accessible to coordinator 130 (e.g., local memory of a machine running coordinator 130). In another embodiment, data structure 400 is distributed across machines 110, where each machine stores a local data structure 400 for probes exchanged between that machine and other machines. Various processing is described below with respect to FIGS. 5-8 that uses information of data structure 400; this processing may be performed by coordinator 130, but may also, or alternatively, be performed by machines 110. Where machines 110 are performing processing (e.g., identifying coded probes, applying a support vector machine, etc.), if one machine is overburdened with other processing, another machine in the pair may retrieve data of data structure 400 of the overburdened machine, and perform the processing on that overburdened machine's behalf.

Figure 5:
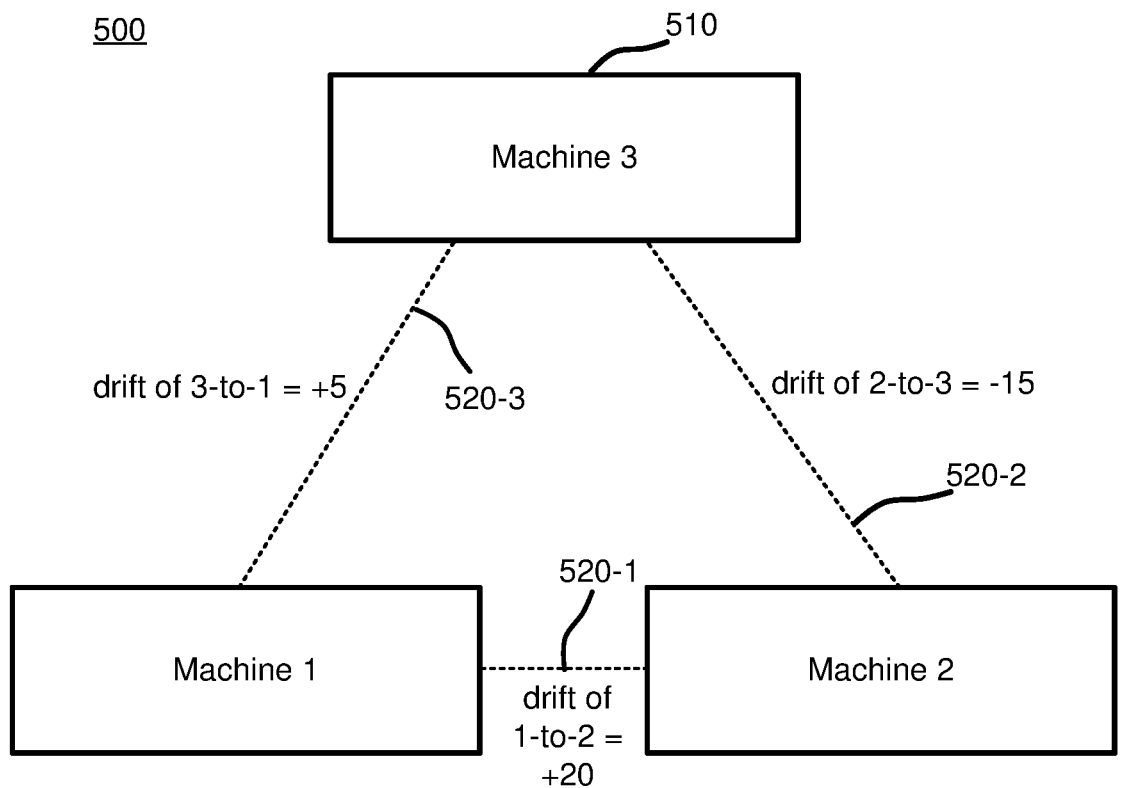
FIG. 5 is a graph of a system that illustrates identifying and correcting loop errors, according to an embodiment of the disclosure.

As was described above with respect to FIG. 2, coded probe records may be input into a classifier, such as an SVM classifier, from which drift may be estimated. However, a drift estimate may nonetheless be inaccurate, but correctable by using the network effect. FIG. 5 is a graph of a system that illustrates identifying and correcting loop errors, according to an embodiment of the disclosure. Machines 510 include machine 1, machine 2, and machine 3, which together form a network loop. Machines 510 have the same functionality described above with respect to machines 110 and 310. While only three machines are depicted, this is merely for convenience; any number of machines may form a network loop. Links 520 connect the machines of the network loop, where links 520-1 connect machine 1 to machine 2, links 520-2 connect machine 2 to machine 3, and links 520-3 connect machine 3 to machine 1. Each link may represent multiple different paths between each pair of machines.

The numbers over each link 520 are the drift between the two machines that are connected by each respective link in arbitrary units. Thus, link 520-1 reflects a drift of +20 units for the drift of machine 1 relative to the drift of machine 2, link 520-2 has a drift of −15 units between machines 2 and 3, and link 520-3 reflects a drift of +5 units between machines 3 and 1. The sum of the drifts around a given loop (referred to as the loop drift error, which is a result of network effect applied to frequency) is reflective of error in an estimated clock drift. Thus, if there was no loop drift error, then the sum of the drifts of all links in the loop would be 0 units. However, as depicted, the sum of the drifts is 10 units (in that 20−15+5=10), which may be caused by inaccurate clock estimates, which can be corrected using the network effect. The coordinator may assign a given machine to be part of multiple loops when assigning pairs. The coordinator may combine all loops for different pairs of machines to estimate clock drift more accurately using the network effect. When assigning pairs, the coordinator is not constrained by a need for path symmetry; the time taken (or number of hops) to go from machine 1 to machine 2 need not be the same as the time taken to go from machine 2 to machine 1. In an embodiment, some of the loops includes reference clock 140, thus ensuring the network effect is determined with respect to the reference clock. In an embodiment (e.g., where coordinator 130 is not present), the network effect can be used without reference to a reference clock, where each clock determines its frequency drift, and a statistical operation (e.g., average) is taken to determine the loop drift error. These loop drift errors around different loops are used to adjust the absolute drift of the machines in the loops. For example, the loop drift error for a loop may be allocated among the different machines in the loop.

Figure 6:
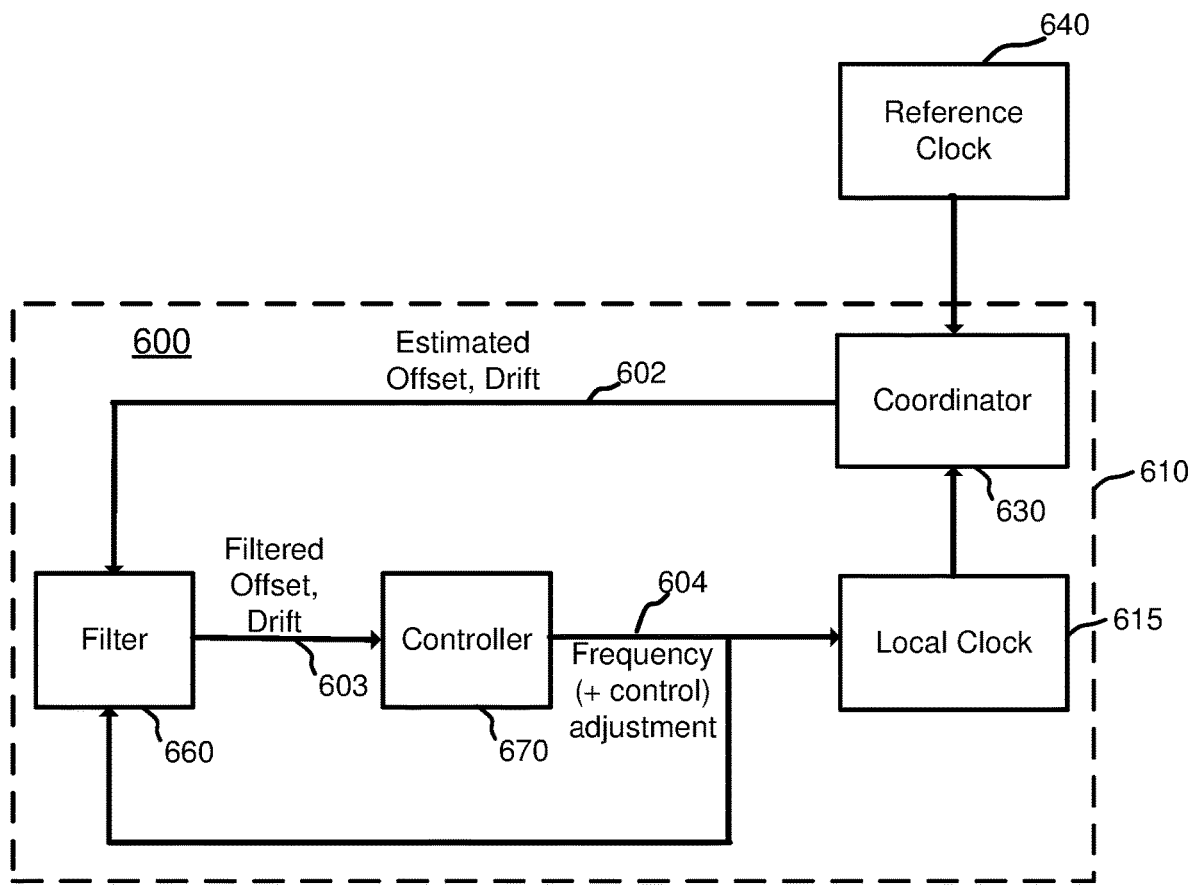
FIG. 6 is a block diagram of a model of a control system to correct a local clock frequency of a machine, according to an embodiment of the disclosure.

FIG. 6 is a block diagram of a model of an adaptive stochastic control system to correct a local clock frequency of a machine, according to an embodiment of the disclosure. Control loop 600 is used to adjust the frequency of a local clock 615 of a machine 610 by way of a control signal 604. The machine 610 may be a machine of network 100, and includes the same functionality described above with respect to machines 110, machines 310, and machines 510. Coordinator module 630 is depicted as part of machine 610, but may alternatively sit wholly or partially in a separate coordinator (e.g., coordinator 130), as described above with respect to FIG. 1.

Coordinator module 630 estimates the absolute offset and absolute drift 602 of machine 610, as described above with respect to FIGS. 2-5. These are absolute quantities because they are measured against the reference clock that is connected to a source of absolute time. The control loop 600 also includes a filter 660 and a controller 670. Filter 660 may be a predefined filter (e.g., a Kalman filter), a filter selected from an adaptive filter bank based on observations, a machine learning model, etc. Kalman filters and adaptive filter banks are discussed in further detail with respect to FIG. 7; use of a machine learning model is discussed in further detail with respect to FIG. 8.

The purpose of filter 660 is two-fold: first, to reduce noise in the drift and offset estimations and, second, to extrapolate the natural progression of the clock. Process 200 (from FIG. 2) repeats on a periodic basis (e.g., every two seconds), and thus control loop 600 loops periodically as well. In an embodiment, clock offsets are estimated in the middle of the period (e.g., 1 second into a 2-second period), whereas control signals happen at the end of the period (e.g., at the 2-second mark of the 2-second period). Thus, filter 660, in addition to reducing noise in the estimate, extrapolates to output 603 filtered offset and drift values that are accurate at the time of control. Filtered offset and drift are received by controller 670. Controller 670 outputs 604 a frequency (and offset) adjustment signal to local clock 615 of machine 610, the adjustment being reflective of frequency and offset value changes in local clock 615 to remove offset and drift from local clock 615. The frequency and offset adjustments are also fed back to filter 660 as parameters for the filter, in addition to the estimated offset and drift for the filter, on a subsequent cycle of the control loop. In this control loop, the plant under control is determined by the state variables {absolute offset, absolute drift} of the local machine and an adaptive stochastic controller is used to control the plant. As will be described with respect to FIG. 7 below, adaptive stochastic control refers to adjusting control signals based on a likelihood that a given adjustment is a correct adjustment, as compared to other possible adjustments; as control signals are applied, actual adjustments are observed, and probabilities that each possible control signal will lead to a correct adjustment are adjusted.

Figure 7:
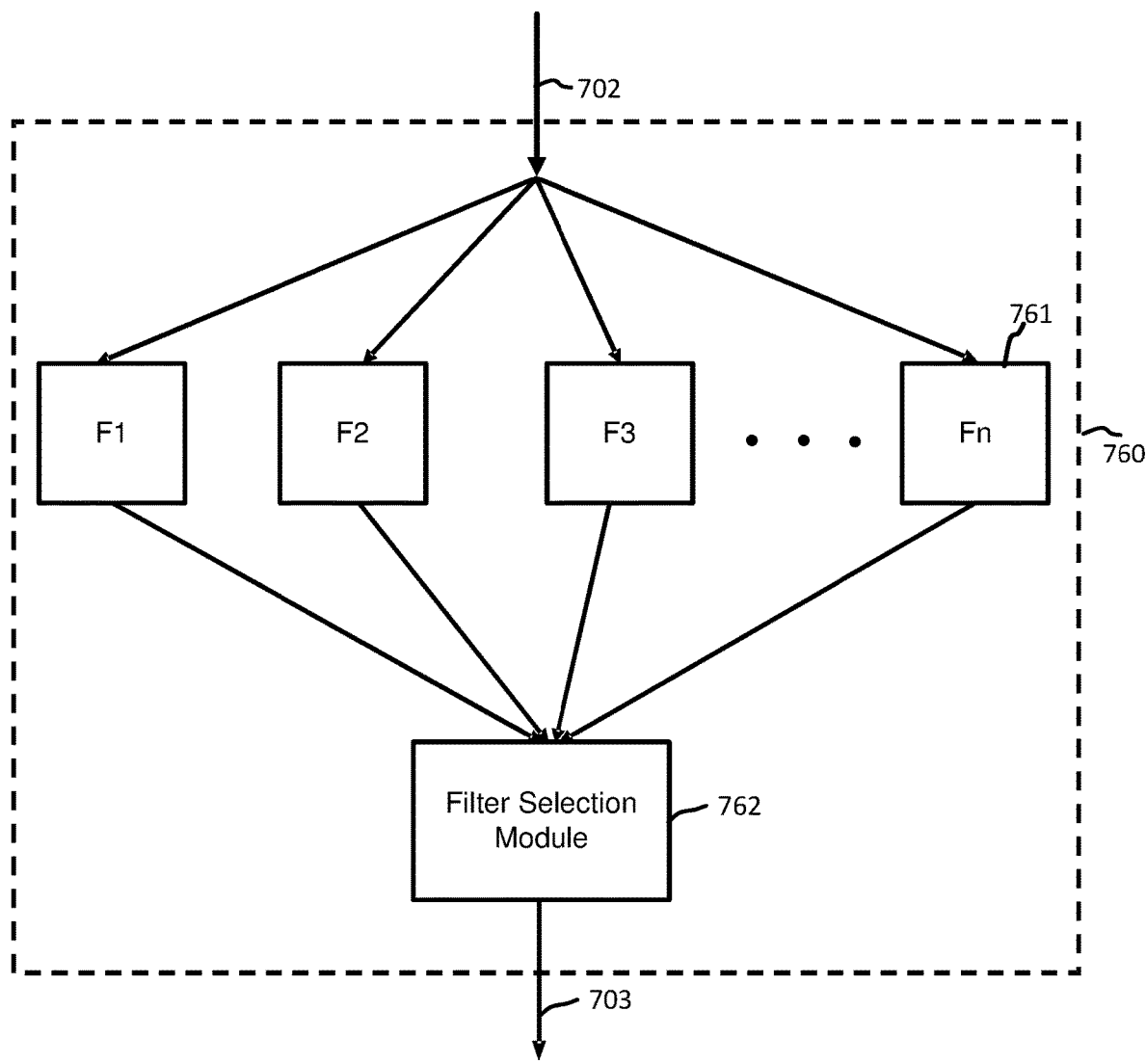
FIG. 7 is a block diagram of an adaptive filter bank, according to an embodiment of the disclosure.

FIG. 7 is a block diagram of an adaptive filter bank, according to an embodiment of the disclosure. The term adaptive filter bank, as used herein, may refer to a collection of candidate filters, each of which is best suited to remove noise from signals based on the type and degree of noise. For example, some noise can be observed, such as the network observations discussed with respect to FIGS. 1-6 (e.g., queuing delays, effect of network operation, loop errors, etc.). Some noise, however, is inherent in the state of the machines, and is unknown to control loop 600 (e.g., noise variations in response to control input across different makes and models of equipment). Noise that is unknown is referred to herein as state noise.

Filter 760, which includes the functionality of filter 660 as described above with respect to FIG. 6, includes a bank of candidate filters 761 (also referred to herein as an adaptive filter bank), which may be Kalman filters. Each of candidate filters 761 corresponds to a different level of state noise. Filter selection module 762 is a stochastic selection module, in that it selects a filter from candidate filter 761 by calculating a probability for each candidate filter being a best fit, and by then selecting the candidate filter with the best fit. Initially, filter selection module 762 receives observed noise, and uses the observed noise to select a highest probability candidate filter 761, which is used to filter the estimated drift and offset 702, and output the filtered drift and offset 703 to the controller 670. Using adaptive stochastic control, it is possible that initially filter selection module 762 may find that all filters are equally likely, and may select a filter arbitrarily. After selecting a filter and observing how local clock 615 reacts to a control signal, filter selection module 762 adjusts the likelihood that each candidate filter 761 best applies. Thus, as the control signal and further information about the network observations are fed into filter 760 over time, the selection of an appropriate candidate filter 761 eventually converges to a best matching candidate filter.

As was discussed with reference to FIG. 2, when deriving the control signal to be transmitted to the local clock of a machine, the correction may be performed in real-time, thus resulting in a real-time control signal (or near real-time control signal). In an embodiment, corrections may be performed offline, such as where observation noise is much smaller than state noise. For example, the coordinator may determine whether observation noise is a predefined amount or factor smaller than the state noise. In response to determining that the observation noise is a predefined amount or factor smaller than the state noise, the coordinator may perform the adjustment offline (or in batched fashion); otherwise, the coordinator may perform the adjustment in real-time or near-real-time and thus cause a control signal to quickly be sent to the local clock. An administrator of the system may set parameters that determine when offline corrections will be made, and may elect that offline corrections are not used at all.

Figure 8:
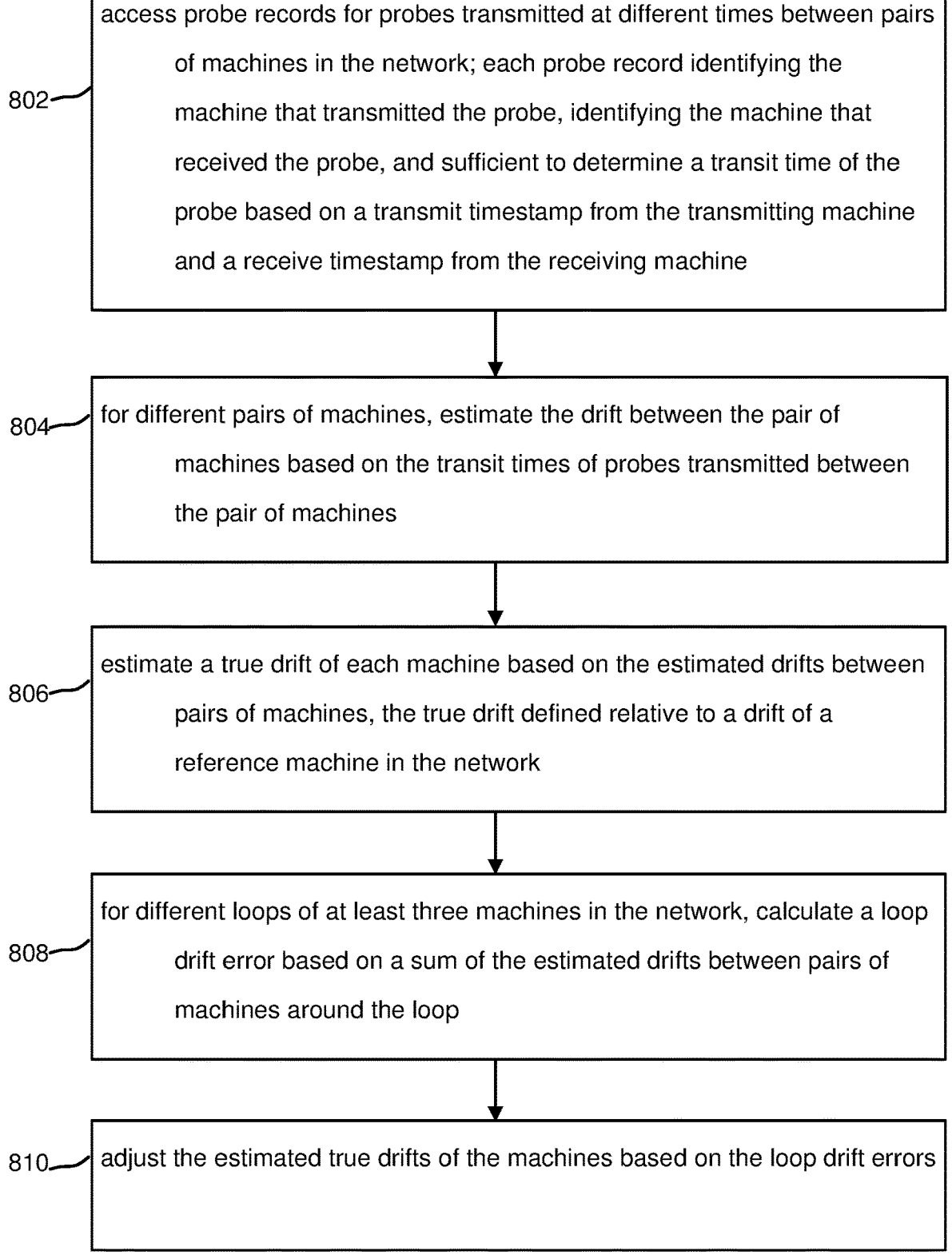
FIG. 8 is a flowchart that illustrates an exemplary process for implementing an embodiment of the disclosure.

FIG. 8 is a flowchart that illustrates an exemplary process for implementing an embodiment of the disclosure. Process 800 begins with a coordinator (e.g., coordinator 130) accessing 802 probe records (e.g., probe records of data structure 400) for probes transmitted at different times between pairs of machines in a network, such as a mesh network. The probe records (e.g., as indexed by probe ID 410) each identify the machine that transmitted the probe (e.g., transmitting machine 420), the machine that received the probe (e.g., receiving machine 430), and provide information sufficient for determining a transit time of the probe based on a transmit timestamp from the transmitting machine and a receive timestamp from the receiving machine. At least one of the machines exchanging probes produces timestamps based on the reference clock. The probe records may be stored within network 100, within a machine executing coordinator 130, or distributed across several machines.

For different pairs of machines, the coordinator (or the machines themselves) estimates 804 the drift between the pair of machines based on the transit times of probes transmitted between the pair of machines. For example, coordinator 130 derives coded probe records from the probe records and applies an SVM to the coded probe records to obtain a linear function, the slope of which is used to estimate the drift between the pair of machines.

In an embodiment, coordinator 130 optionally estimates 806 an absolute drift of each machine based on the estimated drifts between pairs of machines. In an embodiment, to determine absolute drift of a given machine, when the coordinator assigns pairs, each machine is paired with the reference machine. In an alternative embodiment, when the coordinator assigns pairs, each machine is paired with at least one machine that is paired with the reference machine. In a further alternative embodiment, each machine is at least indirectly paired with the reference machine, such that a chain of paired machines, as indicated by the network graph, eventually pairs a paired machine with the reference machine. As described above, reference clock 140 may be integrated into one or more of machines 110, such that one or more machines 110 have a clock that is used as a reference clock.

Coordinator 130 may additionally estimate an absolute offset of each machine. For example, transit times of coded probes feed into the aforementioned linear function, and thus, based on their transit times, the intercept of the linear function is determined. In an embodiment, the absolute offset may be determined to an accuracy on the order of nanoseconds.

As process 800 continues, for different loops of at least three machines, the coordinator calculates 808 a loop drift error based on a sum of the estimated drifts between pairs of machines around one or more loops (e.g., loop 500), as discussed above with reference to FIG. 5. The coordinator then adjusts 810 the estimated absolute drifts of the machines based on the loop drift errors (e.g., using control loop 600, as discussed above with reference to FIGS. 6-7), and transmits instructions to at least one of the machines (e.g., machine 610) to adjust a frequency of that machine's local clock (e.g., local clock 615) based on the estimated absolute drift for that machine.

As was described above with reference to FIG. 6-7, adjusting the frequency of a machine's local clock may include the coordinator applying adaptive stochastic control (e.g., by way of stochastic determination of a filter of filters 761). As used herein, the term stochastic control may refer to applying control signals based on a probability associated with candidate control signals (as dictated by candidate filters of an adaptive filter bank). As a result, state of the plant that is controlled may be modelled by the absolute offset and absolute drift of that machine, as state of the local clock feeds in to control loop 600. In another embodiment, the coordinator may apply a machine learning model as part of the controller to adjust the frequency of the machine's local clock, where the machine learning model receives the estimated absolute drift as an input, and outputs a control signal (e.g., control signal 604) to adjust the frequency of that machine's local clock (e.g., local clock 615).

Figure 9:
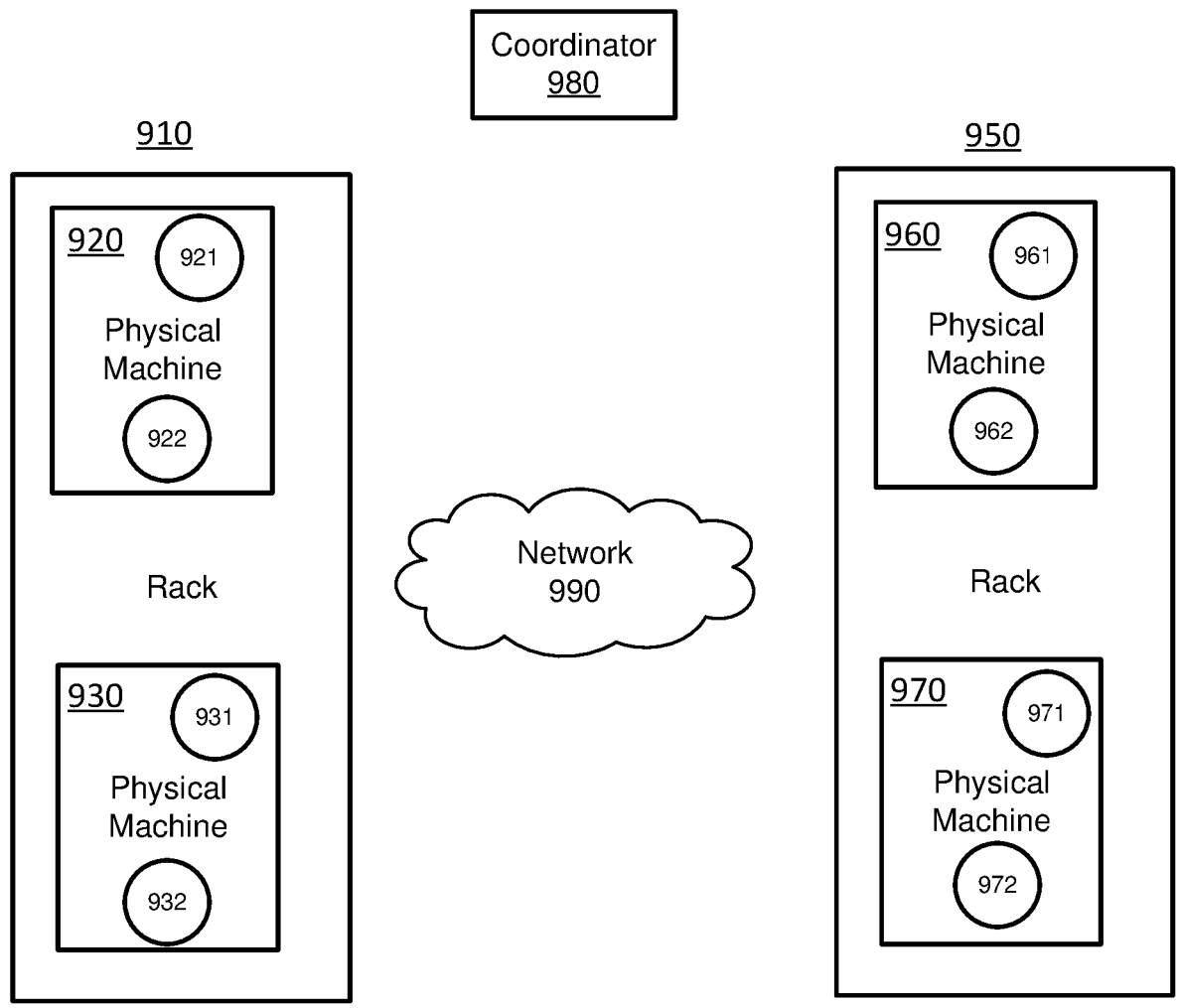
FIG. 9 depicts exemplary virtual resources that may be considered to be co-located, in accordance with an embodiment of the disclosure.

FIG. 9 depicts exemplary virtual resources that may be considered to be co-located, in accordance with an embodiment of the disclosure. As depicted in FIG. 9, logical configurations 910 and 950 include machines 920, 930, 960, and 970, which in turn include respective virtual resources 921, 922, 931, 932, 961, 962, 971, and 972. The virtual resources may communicate with one another using intra-machine communications where they share a machine, intra-logical configuration (e.g., using a bus where they are within a same server rack), and/or using network 990. Network 990 may be any data conduit through which data may be transmitted to or from logical constructions (e.g., the Internet, using WiFi, using short-range communications links such as Bluetooth, a mesh network, and so on). Coordinator 980 performs activity in connection with determining whether virtual resources are co-located. Coordinator 980 may, in an embodiment, have the functionality of coordinator 130, and vice versa, where the same coordinator that performs synchronization and/or syntonization also determines whether virtual resources are co-located.

The term logical construction, as used herein, may refer to a scenario where a same physical hardware is running two or more virtual resources. This means any same hardware architecture, such as being run on a same server, a same rack, a same data center aisle, a same data center, and so on. The use of the term "same physical hardware" establishes some commonality of constraint that affects co-located VMs (e.g., a same power source is shared, a same network interface card (NIC), etc.). Logical constructions 910 and 950 are depicted as racks (e.g., a server rack on which machines 920 and 930 are deployed).

When coordinator 980 determines whether virtual resources are co-located, this may refer to determining that the virtual resources are running on a same physical machine (e.g., virtual resources 921 and 922 are running on same physical machine 920). Alternatively or additionally, co-location may entail being deployed on a same logical construction having a same physical hardware.

Whether virtual resources are co-located can have great impact on applications. For example, where virtual resources are collocated on a same physical host, there is an advantage of having a lower-latency interconnection and higher link bandwidth when they intercommunicate. However, these virtual resources are constrained by needing to share outbound and inbound network capacity. Moreover, these co-located virtual resources could degrade or fail simultaneously in case of hardware problems from their shared physical resources. On the other hand, when virtual resources are not co-located and are instead located on different physical machines or other logical constructions, they would experience higher latency network connectivity and lower link bandwidth when inter communicating, and they could experience volatile conditions based on activity of other virtual machines of other cloud users that share the same physical resources. However, they would enjoy independent outbound and inbound network capacity, and would have uncorrelated failures in the case of their physical resources failing, as those failures would be independent of one another. Coordinator 980 surfaces information about virtual resource co-location to an application administrator, which enables the application administrator to make informed decisions about how to deploy the application across virtual resources based on which ones are and are not co-located.

The term "virtual resource" as used herein may refer to any deployable virtual agent, such as a virtual machine (VM), a virtual network card, or any other virtual agent.

VMs are used as a representative example throughout this disclosure; however, wherever a VM is reference, any virtual resource equally applies. For example, co-location of virtual network cards or any other virtual resource equally apply where VM is mentioned.

In an embodiment, coordinator 980 determines whether virtual resources are co-located based on proxies for distance between virtual resources. Coordinator 980 may aggregate timestamps into a data structure, each timestamp corresponding to one of a sent time or a receive time of a network packet exchanged between two virtual resources (the virtual resources synchronized to a common reference clock, per FIGS. 1-8). That is, coordinator 980 may track distance between two virtual resources using transmission time as a proxy. The data structure may represent one or more raw signals of distance between sets of the virtual resources that exchanged network packets. The different raw input signals may include any combination of clock offset, clock drift rate, series of offset over an observation time, series of drift over an observation time, network latencies between sets of two virtual resources, round trip times between sets of two virtual resources, network bandwidth measurements, predefined topological information, and the like.

To obtain the raw signals, coordinator 980 performs measurements corresponding to each virtual resource used by an application from underlying hardware that is not virtualized. Coordinator 980 may compare the measurements of each virtual resource to determine which virtual resources are co-located. An example is physical hardware clocks, where if two VMs are running on the same physical host, those VMs will share a same clock. In this example, where clocks are running slightly faster or slower, the corrections performed for the two VMs (described with respect to FIGS. 1-8 above) would be to correct the exact same imperfections where the two VMs are collocated. Drift and offset would therefore be the same for the two VMs, and would also change in the same way over time. As another example of measurements, coordinator 980 may obtain network measurements, where coordinator 980 measures one-way delays between VMs. Where two VMs are co-located, their communications do not go through a network link and instead may be performed, e.g., through internal machine interconnections or a bus, thus resulting in much lower one-way delays and round trip times when resources are co-located relative to scenarios where resources are not co-located.

Coordinator 980 may perform these measurements by exchanging network packets between sets of VMs and obtaining indicia of distance on the basis of timestamps of the network packets (e.g., as described above with reference to FIGS. 1-8). Coordinator 980 may generate one or more data structures that include the indicia (e.g., clock drift, one-way delay, etc.) from which distance may be computed (e.g., as mapped to time stamps corresponding to the communications). The network packets may be exchanged passively (e.g., as instructed by an application that uses the virtual resources for a purpose other than measuring distance, where coordinator 980 proactively adds such communications to the data structure), actively (e.g., as instructed by coordinator 980 for the purpose of measuring distance), or some combination thereof.

Coordinator 980 may compute any number of raw input signals may be used to conduct distance matrices between known VMs. For example, in addition to clock synchronization parameters and network latencies, coordinator 980 may determine other signals like bandwidth measurements, topological information provided by a cloud provider, and so on may be taken as a signal. Each signal may have a different level of value or utility.

Figure 10A:
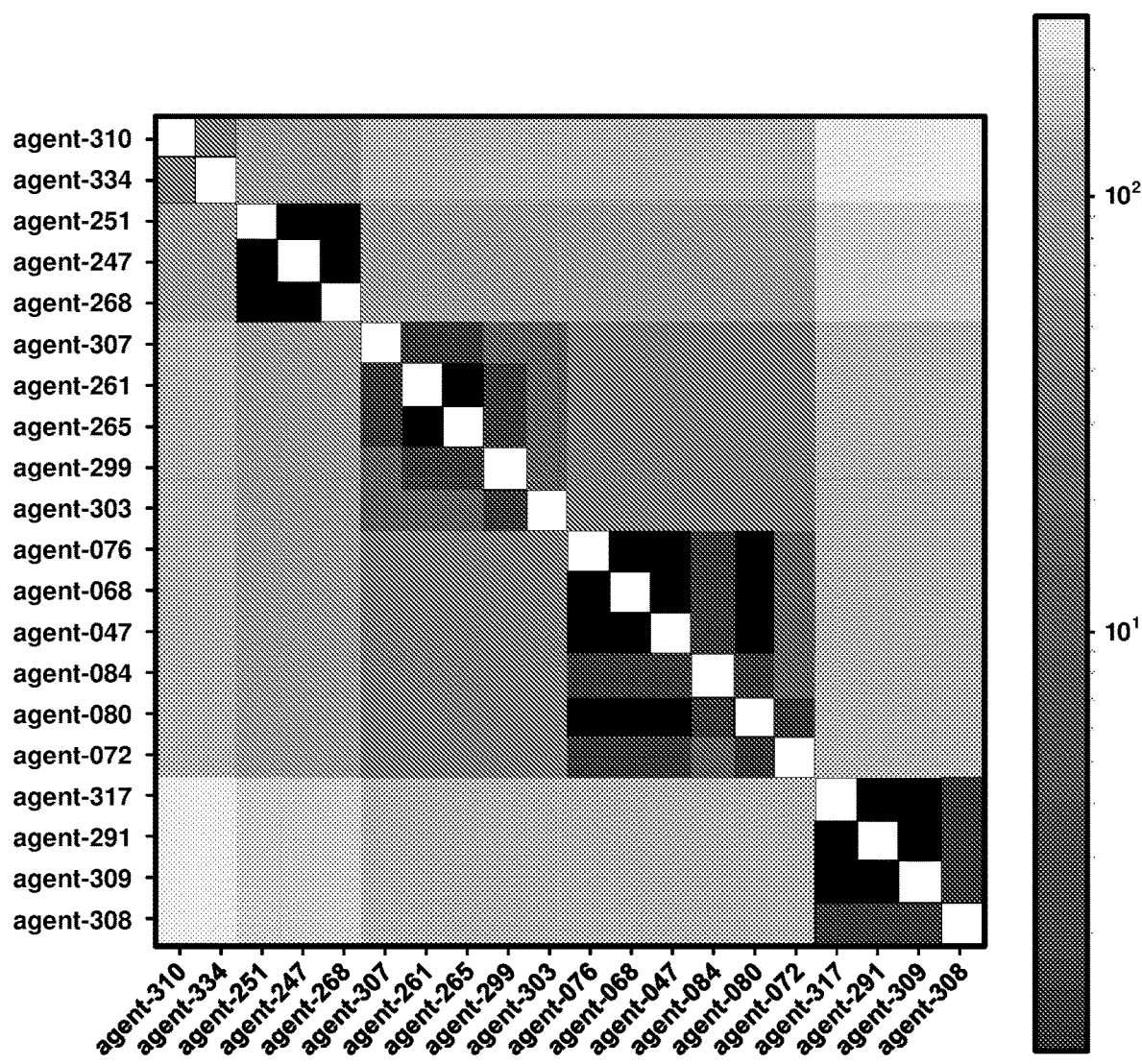
FIG. 10A depicts a less noisy distance matrix between virtual resources, in accordance with an embodiment.
Figure 10B:
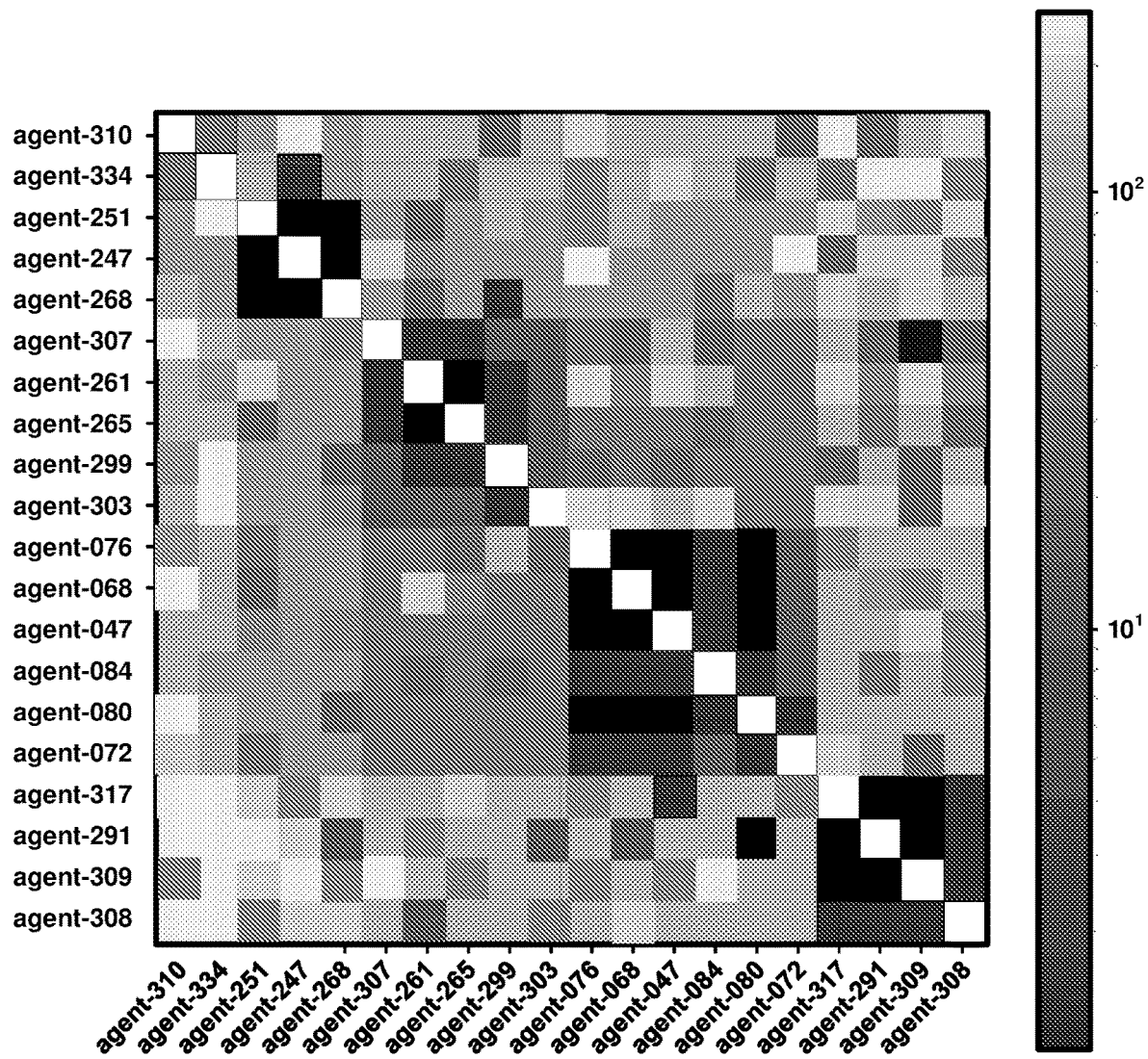
FIG. 10B depicts a more noisy distance matrix between virtual resources, in accordance with an embodiment.

Optionally, coordinator 980 may generate a distance matrix between virtual resources for each different signal. FIG. 10A depicts a less noisy distance matrix between virtual resources, in accordance with an embodiment. FIG. 10B depicts a more noisy distance matrix between virtual resources, in accordance with an embodiment. In both figures, a distance matrix figures is represented and color coded by distance between virtual resources (e.g., agent 310 is a virtual resource, agent 334 is a different virtual resource, and so on). FIG. 10A is an example of using a less noisy signal, thus enabling a clear showing that, for example, agents 310 and 334 are close together in distance, and that agents 251, 247, and 268 are also close together. Coordinator 980 may associate virtual resources that are close together by distance as represented in a distance matrix as co-located, or as potentially co-located. There is much more noise in the signal used to form FIG. 10B, thus resulting in a less accurate assessment by coordinator 980 of closeness.

Figure 11:
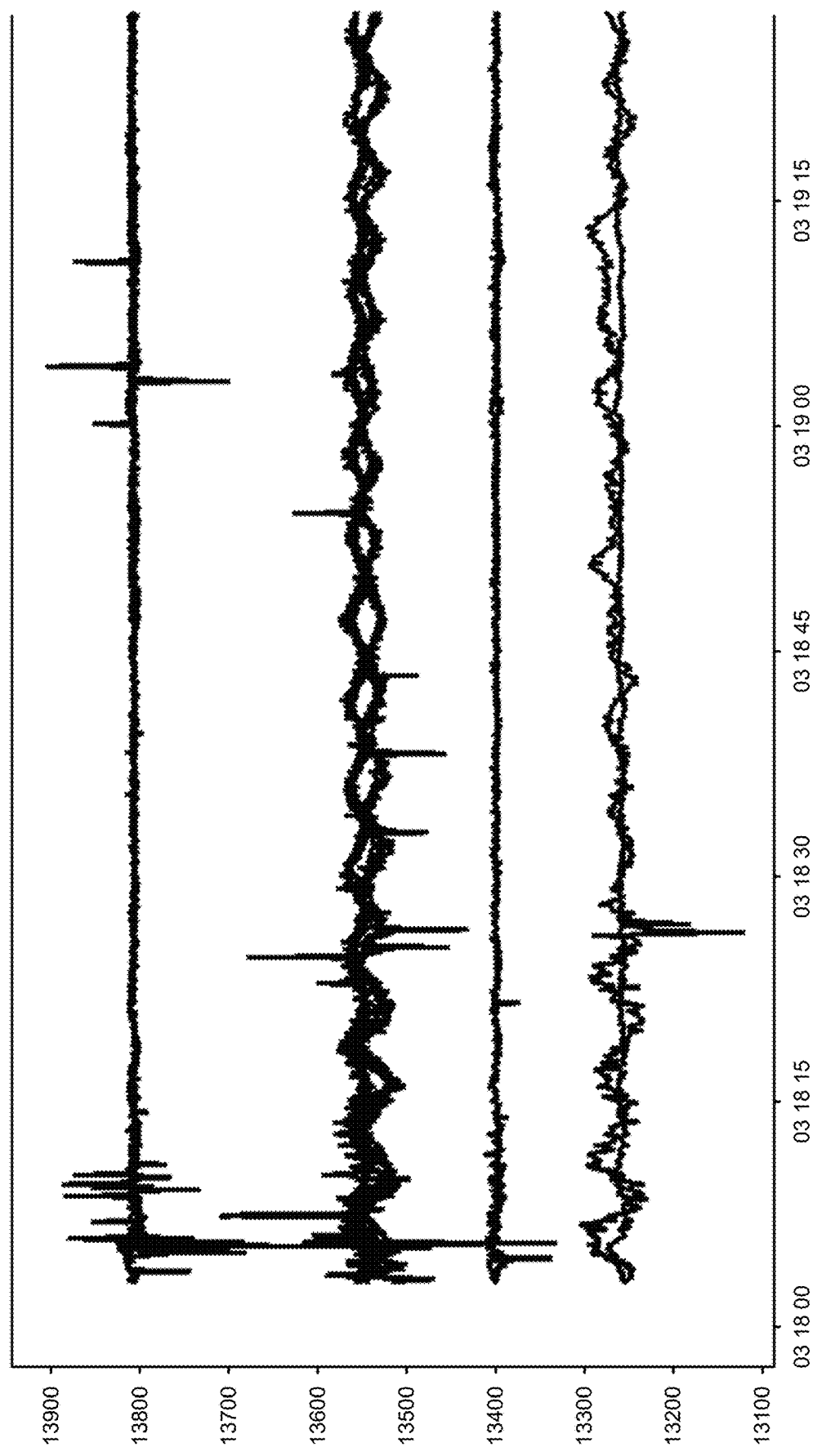
FIG. 11 depicts clock frequency correction activity over time of different virtual resources, in accordance with an embodiment.

In an embodiment, coordinator 980 waits for at least a threshold amount of time to pass from deployment or initialization of an application prior to determining colocations based on measurement signals. One reason for this is that it may take some time for clocks of physical machines to synchronize to a reference clock, and therefore it may take some time for distance measurements based on timestamps and clock correction activity (e.g., correction activity described with respect to FIGS. 1-8) to accurately reflect a local clock state, and therefore coordinator 980 should wait until these signals converge. To illustrate this, FIG. 11 depicts clock frequency correction activity over time of different virtual resources, in accordance with an embodiment. The activity is depicted in a graph, where each grayscale coloration represents clock correction activity by a different virtual resource.

As shown, it is clear that groups of VMs can be easily confused because average values are similar across a grouping. However, it can be seen over time that the VM clock correction activity eventually forms clusters based on convergence of the different waveforms. The longer that metrics are observed, the more likely that coordinator 980 will observe variations that distinguish the true collocated VMs versus false candidates. Therefore, in an embodiment, coordinator 980 waits some minimum time in practice before making a determination on whether two or more VMs are co-located. Coordinator 980 may take measurement signals during the wait period, or may wait to determine measurement signals until this time passes.

After generating distance matrices according to each signal, in an embodiment, coordinator 980 combines the distance matrices. To combine the distance matrices, coordinator 980 may estimate a noise level for a given matrix. Coordinator 980 may apply a weighting to the matrices to give more weight to cleaner ones that have less noise, and to give less weight to noisier distance matrices. The weighting may be linear (e.g., linearly weight based on how much noise is detected) or non-linear. An example of a non-linear combination is to have one matrix overrule the others because it satisfies some predefined condition. For example, responsive to coordinator 980 observing that OWD is larger than a certain threshold (e.g., 20 ms), then by definition (e.g., a predefined heuristic or rules table), coordinator 980 may determine that the two VMs cannot be collocated (e.g., because co-location would always result in an OWD less than that threshold), so coordinator 980 responsively rules out any other matrix. Balanced non-linear combinations are also possible without one matrix dominating the others. In an embodiment, each raw input signal type has a corresponding weight that is automatically applied by coordinator 980. Adaptive combination weights may be applied, where over time coordinator 980 gives more weight to one measurement initially, but then gives more to another at another point in time, based on a confidence measurement over that length of time.

Figure 12:
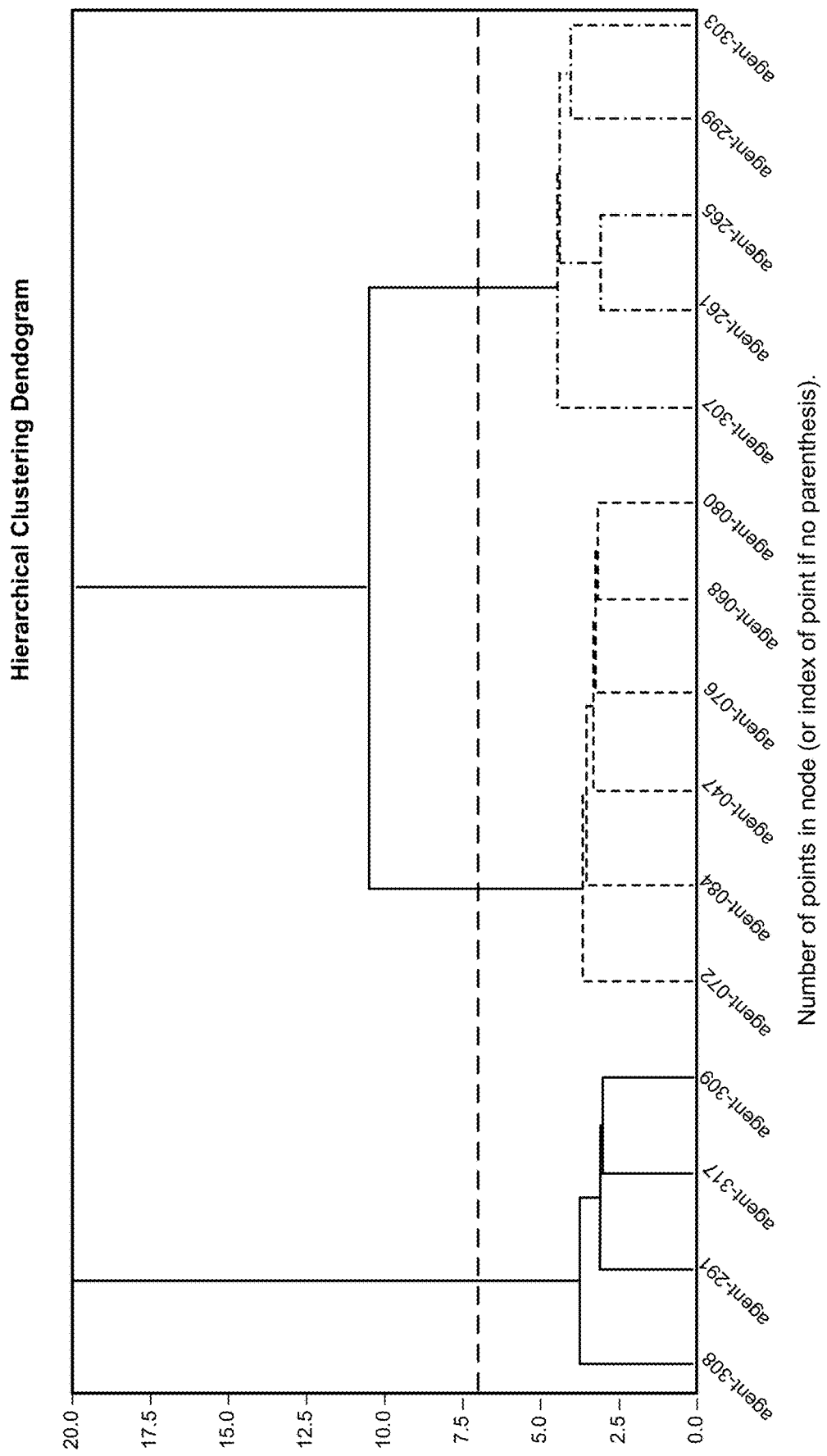
FIG. 12 depicts an exemplary hierarchical clustering dendrogram for determining whether devices are co-located, in accordance with an embodiment of the disclosure.

Following combining the distance matrices into a combined distance matrix, each cell of the combined distance matrix represents a distance between two virtual resources. With this information, in order to identify subsets of VMs that are co-located, coordinator 980 may perform hierarchical clustering. To perform this, coordinator 980 may start by placing every VM separately. The system may then identify pairs that are closest together based on the combined matrix cells, and merge them into a group of 2. Coordinator 980 may then compare groups of 2 and merge those, continuing to merge new groups until a predefined condition is reached. FIG. 12 depicts an exemplary hierarchical clustering dendrogram for determining whether devices are co-located, in accordance with an embodiment of the disclosure. As seen in FIG. 12, groupings of different VMs is performed that are nearest to one another.

In order to determine whether a predefined condition is reached for stopping the merging algorithm, coordinator 980 may use labeled ground truth data to determine what distances between groups maps to distances that represent co-location, and may then cut off the algorithm on that basis. For example, ground truth distance data may exist from a known experiment where VMs are co-located and dispersed on different metrics, and are labeled as co-located or not co-located with respect to one another, and that ground truth data may be used to derive distances between groups that are sufficient to identify co-location. Ground truth is not strictly required—if ground truth is not known, the system may run many examples and identify modes in distance, identifying modes that are low distance and high distance to determine co-location and lack of co-location between VMs. Where ground truth is known, the ground truth may be used to train a supervised machine learning model, such as a neural network, a convolutional neural network, a deep neural network, and/or any other supervised machine learning model, to take as input a plurality of distance metrics describing distance between two VMs, and to output indicia of whether or not the two VMs are co-located.

Coordinator 980 may determine a level of confidence of co-location in any number of ways. In an embodiment, coordinator 980 may cut a dendrogram tree (e.g., as used in hierarchical clustering) at two or more different levels—one main level, one slightly lower level, where if any co-location determinations are different at those levels, then a determination is made as to a lower level of confidence of colocation. In an embodiment, coordinator 980 determines a correlation between signatures of the virtual resources on the basis of any given signal(s). The closer the signatures of the virtual resources are to each other (e.g., the higher the correlation), the higher the confidence level. A threshold may be applied where if the threshold correlation is met, then coordinator 980 determines the confidence level to be 100%, even though there is a less than perfect correlation.

Figure 13A:
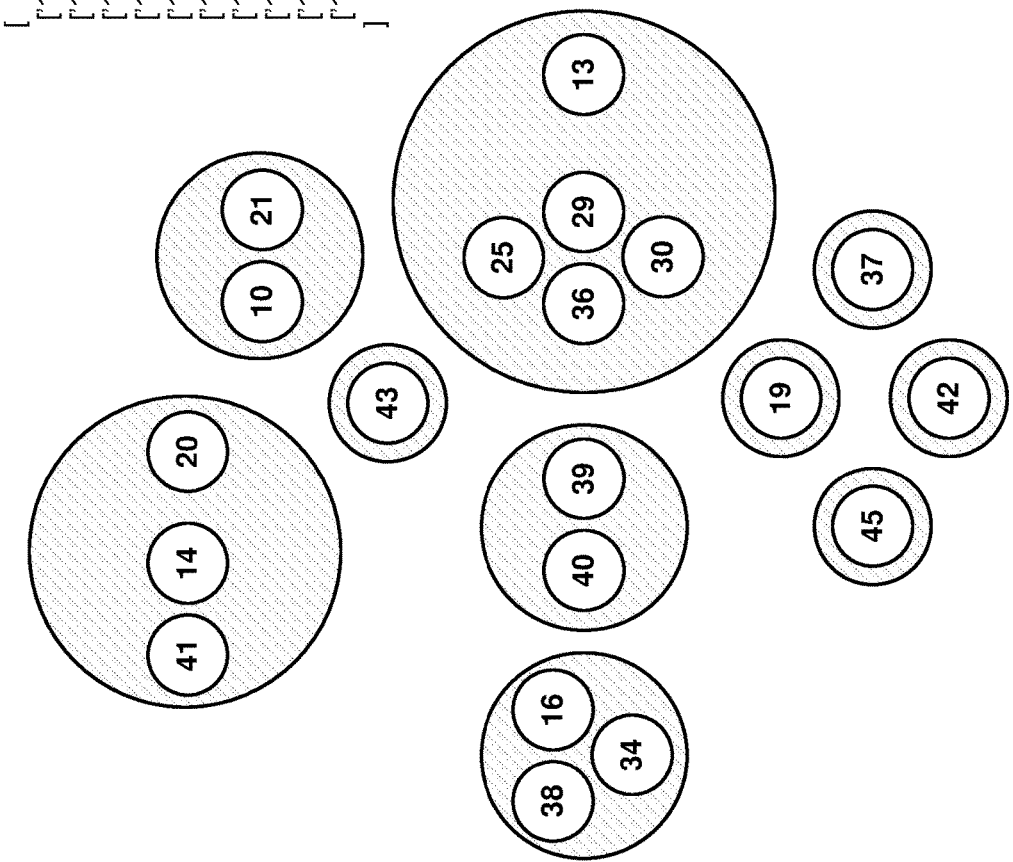
FIG. 13A depicts a graphical user interface showing virtual resources that are determined to be co-located, in accordance with an embodiment of the disclosure.

Coordinator 980 may represent whether VMs are co-located or not by generating a data structure (e.g., showing network addresses for co-located VMs). Alternatively or additionally, the system may output a graphical user interface showing co-located VMs in visual association with one another (e.g., within a circle). FIG. 13A depicts a graphical user interface showing virtual resources that are determined to be co-located, in accordance with an embodiment of the disclosure. Virtual resources are represented in small circles in FIG. 13A, and larger circles encompass virtual resource representations that are determined to be co-located.

Figure 13B:
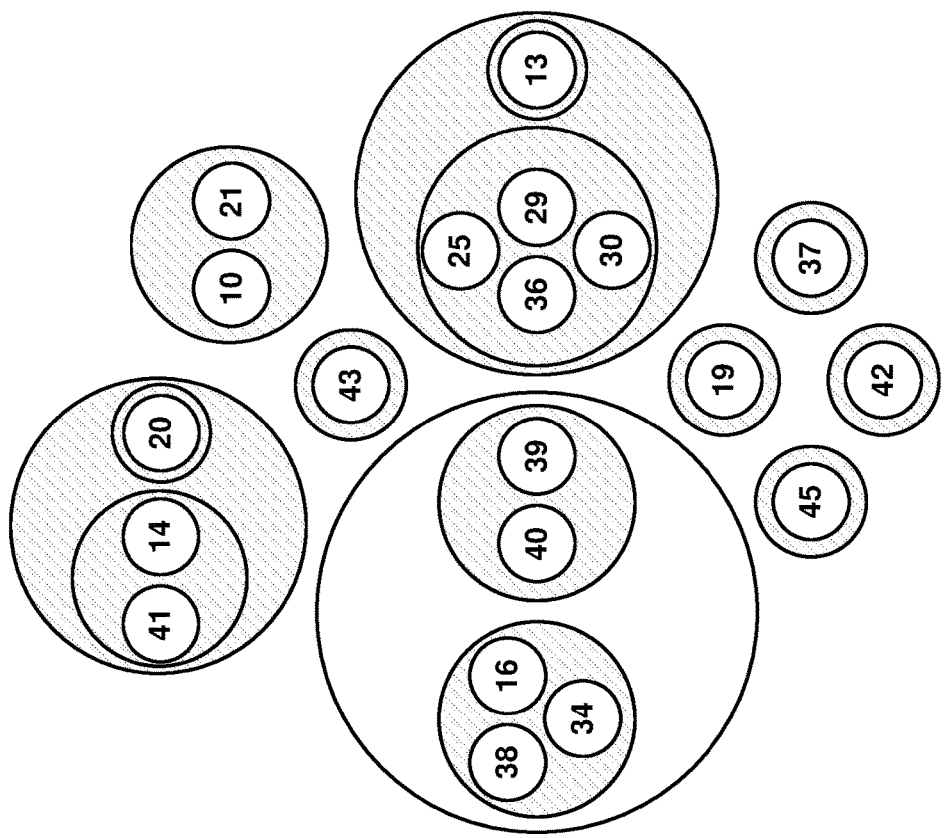
FIG. 13B depicts a graphical user interface showing indicia of a level of confidence that virtual resources are co-located, in accordance with an embodiment of the disclosure.

Confidence and uncertainty may also be portrayed using data structures or visual representations. For example, if the system has softer decisions, the system may convey a notion of uncertainty. FIG. 13B depicts a graphical user interface showing indicia of a level of confidence that virtual resources are co-located, in accordance with an embodiment of the disclosure. As shown in FIG. 13B, coordinator 980 has a level of confidence that VMs 41, 14, and 20 are co-located, but it is possible VMs 41 and 14 are co-located, while VM 20 is not part of that co-located group, and the nested circles convey this uncertainty. Similarly, while VMs 38, 16, and 34 are grouped separately from VMs 39 and 40, an outer circle shows that it is possible that all five of these VMs are co-located.

In an embodiment, coordinator 980 may determine co-location of VMs continuously, periodically, or a periodically over time. This may be useful where VMs may move between physical hardware, such as where a cloud provider migrates a VM from one physical machine to another, which would change what VMs that migrated VM is co-located with. In an embodiment, activity may occur responsive to determining that a VM is co-located. For example, coordinator 980 may transmit an alert to the client of the cloud provider. As another example, coordinator 980 may activate a protocol that requests a different VM is used that satisfies parameters input by a client (e.g., where a client desires co-located VMs and a VM has been migrated from a co-located cluster, the system may request that a different co-located VM with the cluster be provisioned automatically).

The logic described herein with respect to coordinator 980 that determines whether nodes are co-located may be implemented on one or more servers separate from the VMs and physical machines, or may be distributed in whole or in part to agents that operate on the VMs and/or physical machines. That is, activity of coordinator 980 may occur, in whole or in part, on an agent installed within VMs, rather than as an outside coordinator implementation.

Figure 14:
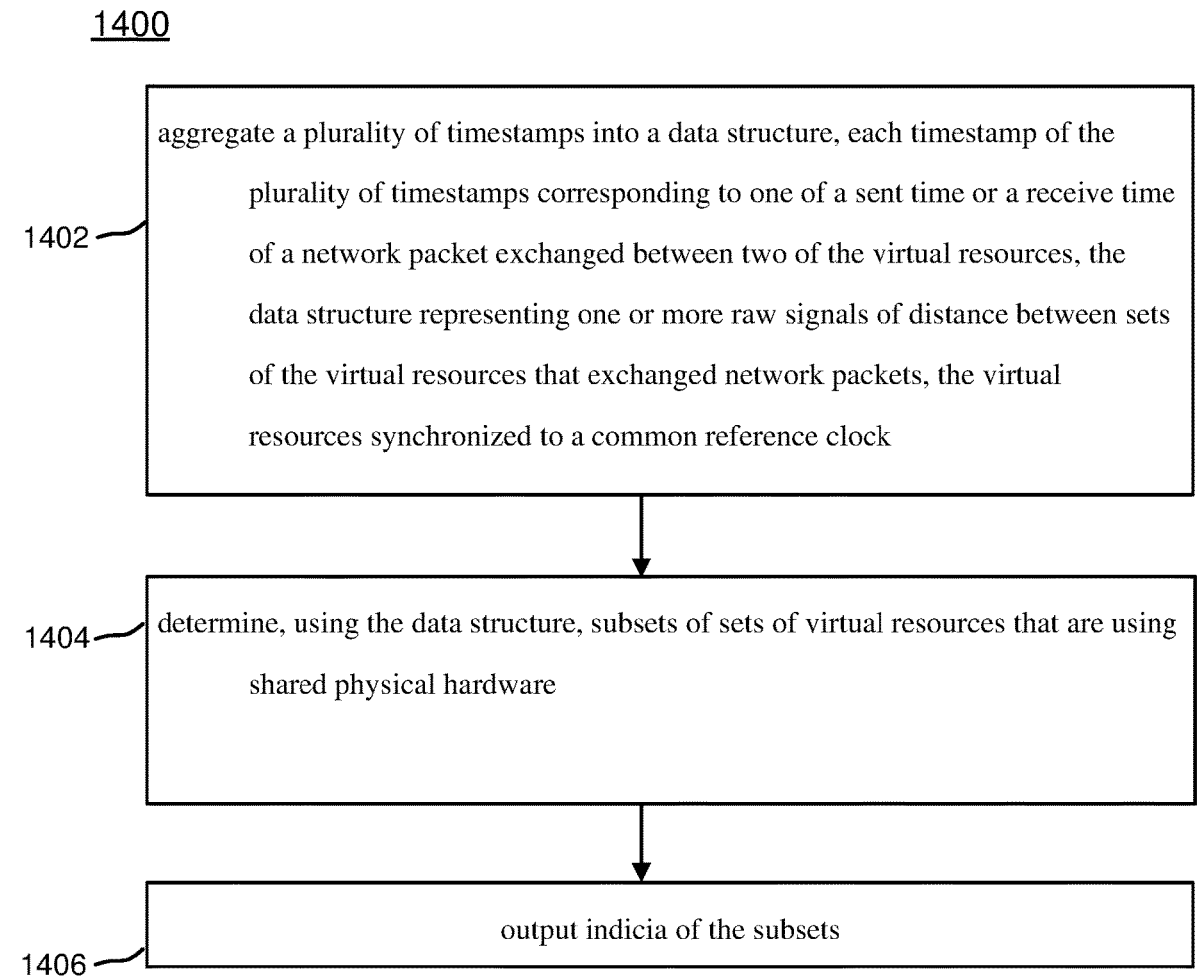
FIG. 14 is a flowchart that illustrates an exemplary process for determining virtual resource co-location using timestamps, in accordance with an embodiment of the disclosure.

FIG. 14 is a flowchart that illustrates an exemplary process for determining virtual resource co-location using timestamps, in accordance with an embodiment of the disclosure. As depicted in FIG. 14, process 1400 may be deployed by coordinator 980 for determining whether virtual resources are co-located on a physical resource. Coordinator 980 may aggregate 1402 a plurality of timestamps into a data structure, each timestamp of the plurality of timestamps corresponding to one of a sent time or a receive time of a network packet exchanged between two of the virtual resources, the data structure representing one or more raw signals of distance between sets of the virtual resources that exchanged network packets, the virtual resources synchronized to a common reference clock. Coordinator 980 may determine 1404, using the data structure, subsets of sets of virtual resources that are using shared physical hardware, and may output indicia of the subsets.

Figure 15:
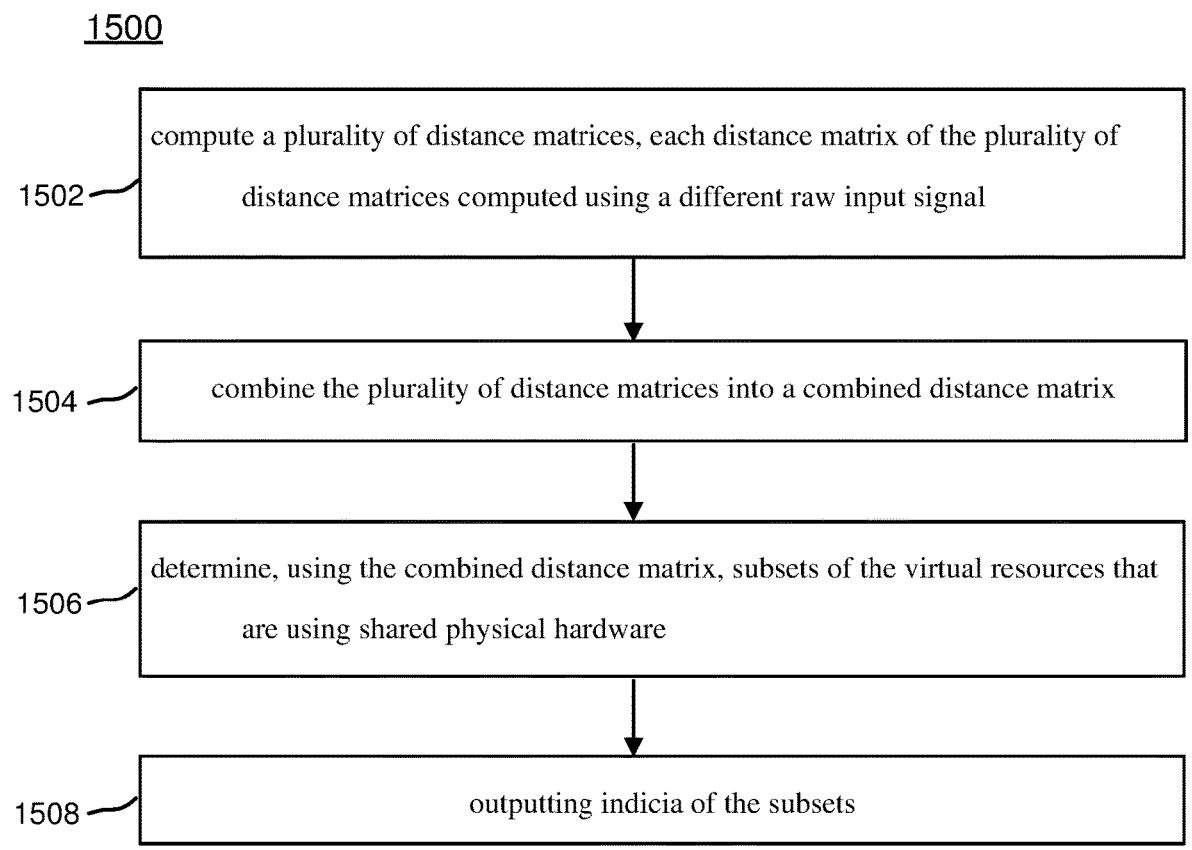
FIG. 15 is a flowchart that illustrates an exemplary process for determining virtual resource co-location using distance matrices, in accordance with an embodiment of the disclosure.

FIG. 15 is a flowchart that illustrates an exemplary process for determining virtual resource co-location using distance matrices, in accordance with an embodiment of the disclosure. As depicted in FIG. 15, process 1500 may be deployed by coordinator 980 for determining whether virtual resources are co-located on a physical resource. Coordinator 980 computes 1502 a plurality of distance matrices, each distance matrix of the plurality of distance matrices computed using a different raw input signal. Coordinator 980 combines 1504 the plurality of distance matrices into a combined distance matrix. Coordinator 980 determines 1506, using the combined distance matrix, subsets of the virtual resources that are using shared physical hardware. Coordinator 980 outputs 1508 indicia of the subsets.

ADDITIONAL CONFIGURATION CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for monitoring for anomalies in network traffic, addressing anomalies, and prioritizing network communications through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for determining whether subsets of a plurality of virtual resources are co-located on a physical resource, the method comprising:
    obtaining a plurality of raw input signals based on communications between sets of the plurality of virtual resources;
    computing a plurality of distance matrices, each distance matrix of the plurality of distance matrices computed using a different raw input signal of the plurality of raw input signals, each distance matrix representing a distance between virtual resources of the plurality of virtual resources;
    combining the plurality of distance matrices into a combined distance matrix;
    determining, using the combined distance matrix, subsets of the virtual resources that are using shared physical hardware and therefore are co-located on the shared physical hardware; and
    outputting indicia of the subsets, wherein outputting the indicia of the subsets comprises generating a graphical user interface that illustrates which virtual resource of a plurality of virtual resources share physical hardware, and wherein the graphical user interface further illustrates candidate alternative groupings of virtual resources that share physical hardware and corresponding levels of confidence with respect to each candidate alternative grouping.

2. The computer-implemented method of claim 1, wherein the different raw input signals comprise one or more of clock offset, clock drift rate, series of offset over an observation time, series of drift over an observation time, network latencies between sets of two virtual resources, round trip times between sets of two virtual resources, network bandwidth measurements, and predefined topological information.

3. The computer-implemented method of claim 1, wherein combining the plurality of distance matrices into the combined distance matrix comprises performing a linear weighted combination, the weights applied based on predefined weights for each different raw input signal.

4. The computer-implemented method of claim 1, wherein combining the plurality of distance matrices into the combined distance matrix comprises a non-linear combination where one distance matrix of the plurality of distance matrices trumps all other matrices of the plurality of distance matrices and is selected as the combined distance matrix.

5. The computer-implemented method of claim 1, wherein the virtual resources comprise one or more of virtual machines (VMs) and virtual network interface cards (vNICs).

6. The computer-implemented method of claim 1, further comprising tracking changes in virtual resource allocation to physical hardware over time.

7. The computer-implemented method of claim 6, wherein changes in virtual resource allocation to physical hardware comprise migration of a given virtual resource to different physical hardware.

8. The computer-implemented method of claim 1, wherein determining, using the combined distance matrix, the subsets of the virtual resources that are using shared physical hardware comprises determining a level of confidence that the determination is correct.

9. The computer-implemented method of claim 7, wherein the indicia comprises the determined level of confidence.

10. A non-transitory computer-readable medium comprising memory with instructions encoded thereon for determining whether subsets of a plurality of virtual resources are co-located on a physical resource, the instructions, when executed, causing one or more processors to perform operations, the instructions comprising instructions to:
 obtain a plurality of raw input signals based on communications between sets of the plurality of virtual resources;
 compute a plurality of distance matrices, each distance matrix of the plurality of distance matrices computed using a different raw input signal of the plurality of raw input signals, each distance matrix representing a distance between virtual resources of the plurality of virtual resources;
 combine the plurality of distance matrices into a combined distance matrix;
 determine, using the combined distance matrix, subsets of the virtual resources that are using shared physical hardware and therefore are co-located on the shared physical hardware; and
 output indicia of the subsets, wherein outputting the indicia of the subsets comprises generating a graphical user interface that illustrates which virtual resource of a plurality of virtual resources share physical hardware, and wherein the graphical user interface further illustrates candidate alternative groupings of virtual resources that share physical hardware and corresponding levels of confidence with respect to each candidate alternative grouping.

11. The non-transitory computer-readable medium of claim 10, wherein the different raw input signals comprise one or more of clock offset, clock drift rate, series of offset over an observation time, series of drift over an observation time, network latencies between sets of two virtual resources, round trip times between sets of two virtual resources, network bandwidth measurements, and predefined topological information.

12. The non-transitory computer-readable medium of claim 10, wherein the instructions to combine the plurality of distance matrices into the combined distance matrix comprise instructions to perform a linear weighted combination, the weights applied based on predefined weights for each different raw input signal.

13. The non-transitory computer-readable medium of claim 10, wherein the instructions to combine the plurality of distance matrices into the combined distance matrix comprise instructions to perform a non-linear combination where one distance matrix of the plurality of distance matrices trumps all other matrices of the plurality of distance matrices and is selected as the combined distance matrix.

14. The non-transitory computer-readable medium of claim 10, wherein the virtual resources comprise one or more of virtual machines (VMs) and virtual network interface cards (vNICs).

15. The non-transitory computer-readable medium of claim 10, the instructions further comprising instructions to track changes in virtual resource allocation to physical hardware over time.

16. The non-transitory computer-readable medium of claim 15, wherein changes in virtual resource allocation to physical hardware comprise migration of a given virtual resource to different physical hardware.

17. The non-transitory computer-readable medium of claim 10, wherein the instructions to determine, using the combined distance matrix, the subsets of the virtual resources that are using shared physical hardware comprise instructions to determine a level of confidence that the determination is correct.

18. The non-transitory computer-readable medium of claim 17, wherein the indicia comprises the determined level of confidence.

* * * * *